(12) United States Patent
Bryant et al.

(10) Patent No.: US 12,294,127 B2
(45) Date of Patent: May 6, 2025

(54) SYSTEM AND METHODS FOR DETERMINING A STACK CURRENT REQUEST BASED ON FUEL CELL OPERATIONAL CONDITIONS

(71) Applicant: Hyster-Yale Materials Handling, Inc., Fairview, OR (US)

(72) Inventors: Jacob Bryant, Portland, OR (US); John Robey, Clackamas, OR (US); Troy Fox, Tigard, OR (US); Chenyao Chen, Portland, OR (US); Tabassum Hossainy, Portland, OR (US); David Brisbine, Sandy, OR (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 0 days.

(21) Appl. No.: 18/627,793

(22) Filed: Apr. 5, 2024

(65) Prior Publication Data

US 2024/0258544 A1   Aug. 1, 2024

Related U.S. Application Data

(63) Continuation of application No. 17/842,566, filed on Jun. 16, 2022, now Pat. No. 11,990,656.

(60) Provisional application No. 63/234,638, filed on Aug. 18, 2021, provisional application No. 63/222,321, filed on Jul. 15, 2021, provisional application No. 63/211,087, filed on Jun. 16, 2021.

(51) Int. Cl.
*H01M 8/04* (2016.01)
*H01M 8/0432* (2016.01)
*H01M 8/04858* (2016.01)

(52) U.S. Cl.
CPC ..... *H01M 8/0491* (2013.01); *H01M 8/04358* (2013.01); *H01M 2250/20* (2013.01)

(58) Field of Classification Search
CPC .......... H01M 8/0491; H01M 8/04358; H01M 2250/20
USPC ......................................................... 429/413
See application file for complete search history.

(56) References Cited

U.S. PATENT DOCUMENTS

| | | | | |
|---|---|---|---|---|
| 2009/0280372 A1* | 11/2009 | Maenaka | .......... | H01M 8/04768 429/429 |
| 2014/0120436 A1* | 5/2014 | Blanchet | ........... | H01M 8/04835 429/414 |
| 2015/0280477 A1* | 10/2015 | Kusumoto | ........ | H01M 8/04559 320/101 |
| 2016/0300672 A1* | 10/2016 | Noguchi | ............... | B60R 16/023 |

* cited by examiner

*Primary Examiner* — James M Erwin

(57) ABSTRACT

A stack current controller may be configured to request a current magnitude from a fuel cell. The current magnitude requested is based at least on a battery state of charge and is performed in a stepwise manner among a plurality of current magnitude steps, where each current magnitude step includes a debounce range with respect to at least one other current magnitude step. The stack current controller may be configured to control the fuel cell to output the requested current magnitude, determine an average current output by the fuel cell over a time period, and modify a current magnitude associated with one of the current magnitude steps based on the average current.

18 Claims, 11 Drawing Sheets

SYSTEM AND METHODS FOR DETERMINING A STACK CURRENT REQUEST BASED ON FUEL CELL OPERATIONAL CONDITIONS

FIELD OF THE PRESENT DISCLOSURE

The present disclosure relates generally to fuel cell systems and batteries. More particularly, the present disclosure relates to a system or systems directed to determining a stack current request based on a state of charge of a battery, determining a stack current request when coolant temperature falls below a desired temperature, and determining a stack current request when coolant temperature rises above a desired temperature, individually, or in any combination.

BACKGROUND

A fuel cell generates electrical power by converting chemical energy of a fuel into electrical energy by way of an electrochemical reaction, without combustion. Fuel cells typically utilize hydrogen as a fuel and oxygen (usually from air) as an oxidant in the electrochemical reaction. The electrochemical reaction results in electricity, by-product water, and by-product heat. The electrical power generated by a fuel cell may be fed to batteries so that the batteries don't deplete and meet different environment requirements for the fuel cell (e.g., temperature, airflow, and the like). During battery charging a stack current may varies. Due to frequent variations or changes in the stack current the environment requirements for a fuel cell may not be met or met less often and may cause damage to the fuel cell. Additionally, frequent variations of stack current initiate changing requirements for the overall fuel cell system which may then need to re-adjust to match the changing requirements, which is time consuming and may lead to decreases in fuel cell system performance.

SUMMARY OF THE DISCLOSURE

The present disclosure provides a stack current controller. The stack current controller may be configured to determine a stack current request based on a state of charge of a battery operationally connected to the fuel cell. The stack current request may refer to a magnitude of a current that is requested from a fuel cell for charging the battery. The stack current controller may determine the stack current request based on stack current magnitude levels and corresponding different thresholds for state of charge (SOC) of the battery. For example, if the battery SOC is less than 30% (which may be a first SOC threshold), then the stack current controller may request 275 A stack current (which may be the corresponding first requested stack current level). If the SOC is 30% or more, but less than 40% (which may be a second SOC threshold), then the stack current controller may request 200 A stack current (which may be the corresponding second requested stack current level). If the SOC is 40% or more, but less than 50% (which may be a third SOC threshold), then the stack current controller may request 150 A stack current (which may be the corresponding third requested stack current level). Other suitable SOC thresholds and requested stack currents may be used depending on desired performances, battery configuration, fuel cell configuration, or other suitable factors.

Further, in an embodiment, the SOC thresholds corresponding to two requested stack current levels may overlap in a range, which may be referred to as a debounce range or a debounce level of the SOC thresholds. The SOC thresholds in the debounce range may be separated by a configurable SOC value, for example 5%. That is to say, there may be a first SOC threshold of 40% and a second SOC threshold of 45%, for a requested stack current magnitude of 150 A. Then, the entire range of SOC values within the range of SOC between 40%-45% may be considered the debounce range for a stack current magnitude of 150 A, as an example. The advantage of this debounce range is that as long as the SOC value for the corresponding requested stack current magnitude is within this debounce range there is no switching between stack current magnitude levels.

Thus, having the debounce range as described above, hinders abrupt and frequent switching between stack current magnitude levels, which ultimately helps in improving overall life of system components of a fuel cell.

Additionally, in some embodiments, the stack current controller may be configured to request the stack current magnitude at each battery SOC level in such a manner to avoid the occurrence of resonance between a fan and an air compressor associated with the fuel cell, which may occur at a specific current. Avoiding such a stack current magnitude may provide a less noisy operation of the overall fuel cell and battery system.

The present disclosure also provides a system and a method for controlling a coolant temperature of a fuel cell via stack current requests. Controlling the coolant temperature may refer to maintaining an actual coolant temperature at a desired coolant temperature setpoint when a fuel cell is operating in a relatively low ambient temperature. For reference, a reference to coolant temperature setpoint includes the actual coolant temperature setpoint and alternatively to either an upper or lower coolant temperature threshold as appropriate for either decreasing or increasing, respectively, the coolant temperature as described throughout this specification. The system receives an actual coolant temperature and the desired coolant temperature setpoint. The system determines an error based on a difference between the actual coolant temperature and the desired coolant temperature setpoint. This error is indicative of how cold the coolant is compared to the coolant temperature setpoint. Further, the system determines a stack current magnitude to request from the stack based on the error. The determined stack current magnitude may be the lowest current magnitude that provides sufficient heat to maintain the actual coolant temperature at the desired coolant temperature setpoint. As a result, the actual coolant temperature may become equal to, or fall within a temperature threshold with respect to, the desired coolant temperature setpoint when the fuel cell operates in relatively low ambient temperatures.

The present disclosure also provides a system and a method for controlling the stack current requested from the fuel cell based on an error value associated with the coolant temperature and the fan speed of the fan unit of the fuel cell system. The system determines the error value based on a difference between an actual coolant temperature and a coolant temperature setpoint. The system controls the stack current request to determine the highest current magnitude at which the coolant temperature setpoint may be sustained. To that end, the system includes a function that is enabled and disabled to regulate the stack current request for the fuel cell. The function may be enabled when the fan speed exceeds a threshold fan speed value and the coolant temperature exceeds the coolant temperature setpoint, for a predefined time-period. More specifically, the system may be configured to determine the error value associated with the difference between the actual coolant temperature and the coolant temperature setpoint, and further to operate to decrease such error. Further, the system may be configured to monitor the fan speed for a predetermined duration to check if the fan speed is above or below a threshold fan speed. Further, the system may modulate the stack current magnitude requested based on decreasing the error value associated with the coolant temperature setpoint and monitoring the fan speed. Further, the highest current magnitude corresponding to the coolant temperature setpoint that may sustain operating conditions for the fuel cell system with the coolant temperature within a threshold of the coolant temperature setpoint may be referred to as a "smart ceiling" current and the corresponding function as a "smart ceiling" function. Furthermore, the smart ceiling function may be disabled when the fan speed is below the threshold fan speed and the coolant temperature is at the coolant temperature setpoint, or within a coolant temperature threshold with respect to the coolant temperature setpoint, for a predefined time-period.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF EXAMPLE EMBODIMENTS

Figure 1:
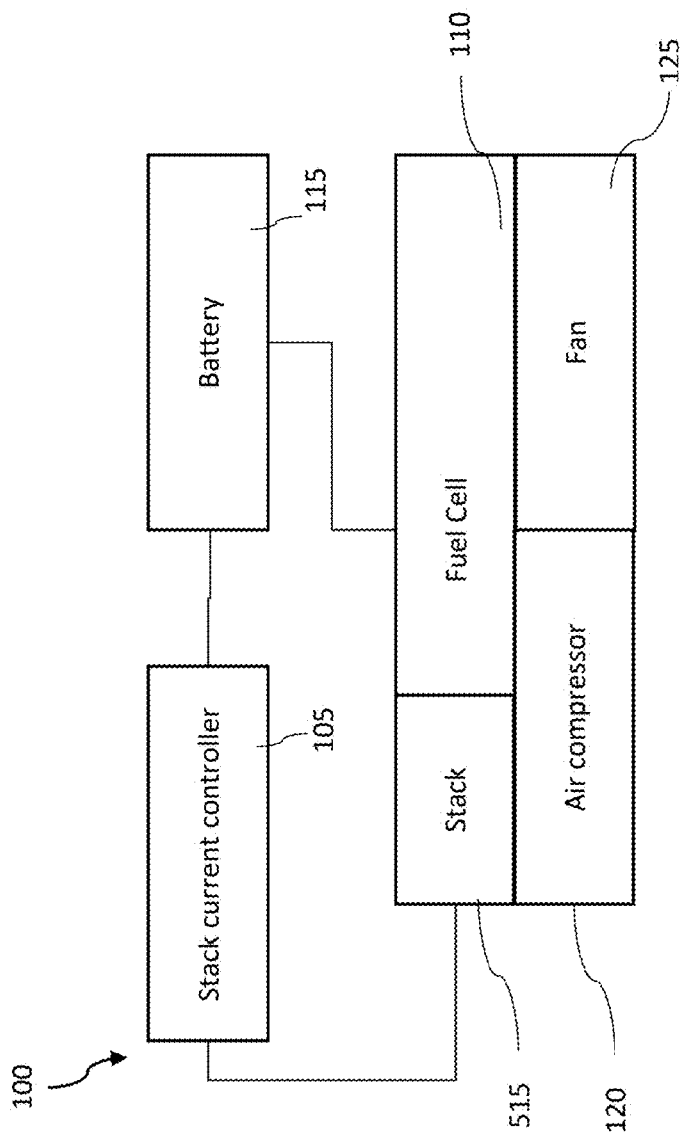
FIG. 1 shows a block diagram of a system for determining a stack current request based on a state of charge of a battery, a coolant temperature, or both, in accordance with one or more embodiments of the present disclosure.

In the following detailed description, reference is made to the accompanying drawings which form a part hereof wherein like numerals designate like parts throughout, and in which is shown by way of illustration examples that may be practiced. It is to be understood that other examples may be utilized, and structural or logical changes may be made without departing from the scope of the present disclosure. Therefore, the following detailed description is not to be taken in a limiting sense, and the scope of examples is defined by the appended claims and their equivalents.

Aspects of the disclosure are disclosed in the accompanying description. Alternate examples of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described example. Various additional operations may be performed and/or described operations may be omitted in additional examples.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an example," or "in examples," which may each refer to one or more of the same or different examples. Furthermore, the terms "comprising," "including," "having," and the like, as used with respect to examples of the present disclosure, are synonymous.

As used in reference to the operation systems herein, the term "operation" may refer to a single procedure (such as adjusting a travel speed of a vehicle) that may be performed by the operation systems. As used in reference to the operator input device herein, the term "action" may refer to a procedure to be performed by the vehicle that may be made up of one or more operations to be performed by the operation systems.

As used herein, the term "controller" may refer to, be part of, or include one or more of an Application Specific Integrated Circuit (ASIC), an electronic circuit, a processor (shared, dedicated, or group) and/or memory (shared, dedicated, or group), a proportional controller, an integral controller, and a derivative controller, that execute one or more software or firmware programs, a combinational logic circuit, and/or other suitable components that provide the described functionality.

Stack Current Control

FIG. 1 shows a block diagram of a system 100 for determining a stack current request based on a state of charge of a battery 115, in accordance with one or more embodiments of the present disclosure. A stack current controller 105 is configured to determine a stack current request for a fuel cell 110 based on a state of charge of the battery 115. The stack current request may refer to a magnitude of a current to be requested from the fuel cell stack 515 for charging the battery 115.

In an embodiment, the stack current controller 105 obtains the state of charge of the battery 115 to use as a basis for requesting a stack current magnitude from the fuel cell stack 515. The battery 115 state of charge may be determined by the stack current controller 105 based on a voltage and current of the battery 115, a temperature of the battery 115, characteristics of a model of the battery 115, from a battery management system, or based on other relevant indicia relating to the battery 115. Optionally, the controller 105 may obtain a coolant temperature and determine whether the coolant temperature is within a coolant temperature threshold that is above and below a coolant temperature setpoint. Normal processing may proceed based on the battery state of charge if the coolant temperature is within the coolant temperature threshold.

The stack current controller 105 requests different stack current magnitudes from the fuel cell 110 based on the state of charge of the battery 115. The fuel cell 110 comprises an air compressor 120, a fan 125, and a stack 515. The air compressor 120 may blow air into the fuel cell 110 and the fan 125 is configured to cool the fuel cell 110. The stack 515 generates an electrical current. The air compressor 120 and fan 125 may have a resonance frequency at a particular stack current magnitude, for example, at 180 A. If such a particular current magnitude is requested from the fuel cell stack 515 the resonance of the air compressor 120 and the fan 125 may produce an undesirable noise. Thus, the stack current controller 105 may be configured to request stack current magnitudes other than a current magnitude that produces a resonance between the compressor 120 and the fan 125 to avoid noise associated with such resonance, thus providing a quieter operation of the system 100, which may be installed in a vehicle such as a forklift or other suitable vehicle.

Additionally, the stack current controller 105 may be configured to request stack current magnitudes in such a manner that instead of continuously changing the stack current magnitude in response to changes to the state of charge of the battery 115 the stack current controller 105 requests stack current magnitudes in a stepwise fashion as explained with reference to FIGS. 1-4.

Figure 2:
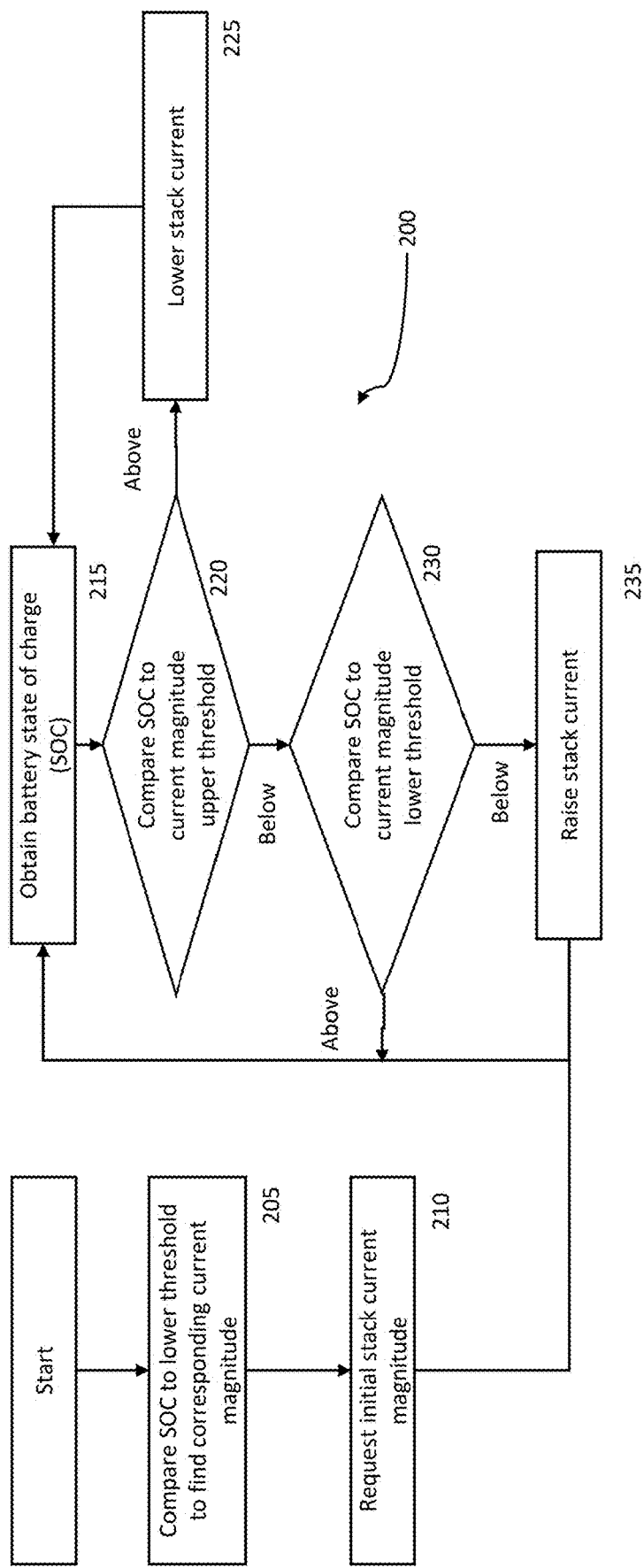
FIG. 2 shows a processing flow, in accordance with one or more embodiments of the present disclosure.

FIG. 2 illustrates a flowchart of a method 200 for requesting stack current magnitudes from the fuel cell 110 in a stepwise manner based on the state of charge of the battery 115. FIG. 2 is explained in conjunction with FIG. 3, where FIG. 3 illustrates a plot of different stack current magnitudes (which are the requested stack current magnitudes) plotted along Y-axis against the percentage values corresponding to different battery state of charge levels plotted along X-axis.

Figure 3:
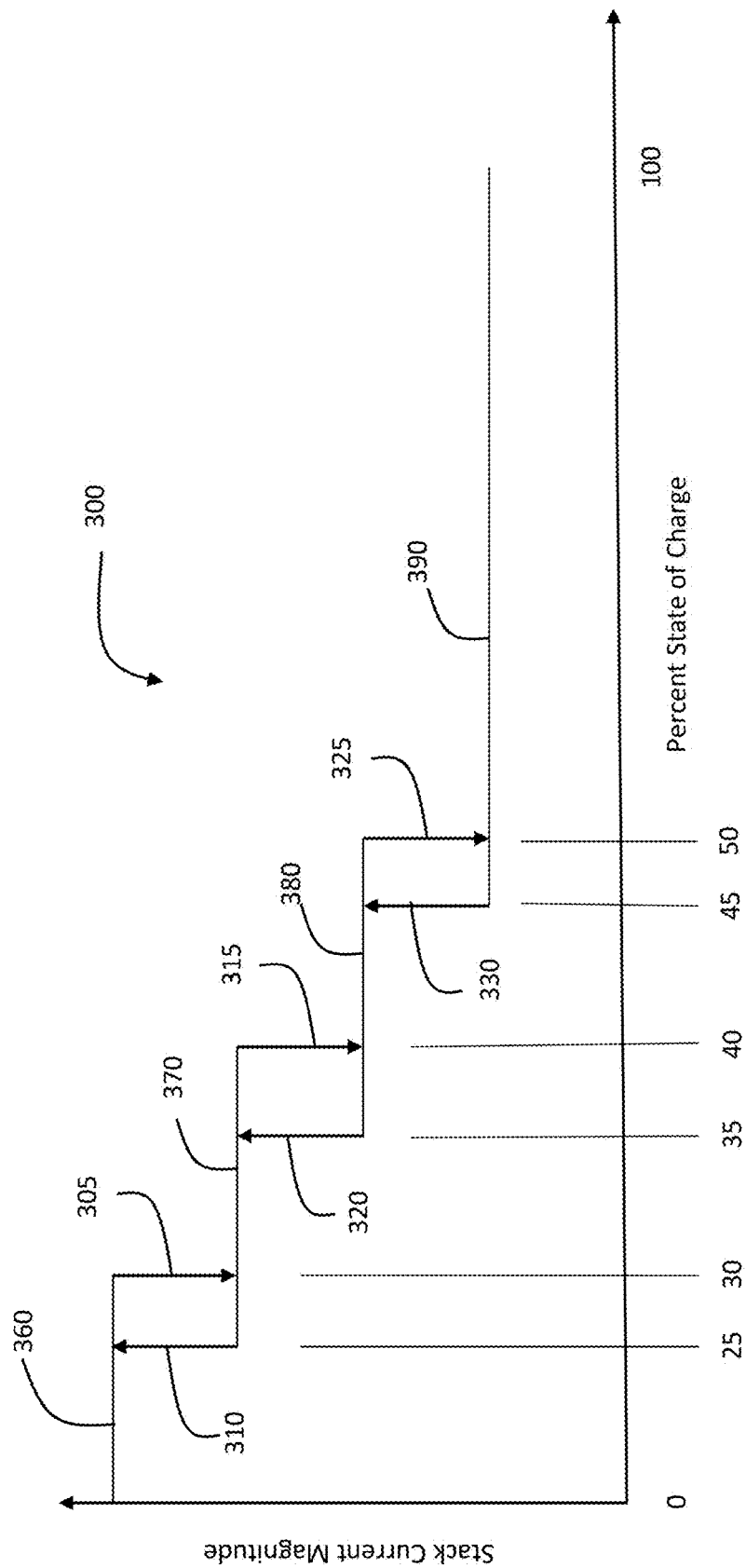
FIG. 3 shows step curves plotted between stack current magnitude and battery state of charge, in accordance with one or more embodiments of the present disclosure.

FIG. 3 represents four different stack current magnitude steps, a first stack current magnitude step 360, a second stack current magnitude step 370, a third stack current magnitude step 380, and a fourth stack current magnitude step 390. The first stack current magnitude 360 represents the highest stack current value among the four magnitude steps, and the fourth stack current level 390 represents the lowest stack current magnitude among the four magnitudes. Each stack current magnitude has either a lower state of charge threshold, to increase the stack current magnitude (requested from fuel cell stack 515), or an upper state of charge threshold, to decrease the stack current magnitude, or both. FIG. 3 shows each stack current magnitude with its respective thresholds.

The first stack current magnitude 360 (that is the highest stack current value) has only an upper first threshold 305 of battery 115 state of charge to decrease the stack current magnitude, such as to stack current magnitude 370, because current cannot be increased beyond the maximum stack current (value at) magnitude 360.

The fourth stack current magnitude 390 (that is the lowest stack current value) has only a lower fourth threshold 330 to increase the stack current magnitude, such as to stack current magnitude 380, because current cannot be decreased beyond the minimum stack current (value at) magnitude 390.

In between the highest and the lowest stack current magnitudes, that is between the stack current magnitudes 360 and 390 respectively, there can be one or a plurality of intermediate stack current magnitudes. The second stack current magnitude 370 and the third stack current magnitude 380 in FIG. 3 form two intermediate magnitudes between the (highest) first stack current magnitude 360 and the (lowest) fourth stack current magnitude 390. Each of the intermediate stack current magnitudes have an upper state of charge threshold and a lower state of charge threshold. For example, the second stack current magnitude 370 has a lower second threshold 310 for battery 115 state of charge and an upper second threshold 315 for battery 115 state of charge. The third stack current magnitude 380 has a lower third threshold 320 for battery 115 state of charge and an upper third threshold 325 for battery 115 state of charge. The lower third threshold 320 for the third stack current magnitude 380 and the upper second threshold 315 for the second stack current magnitude 370 overlap with a debounce range value for battery 115 state of charge in between. This debounce range value is configurable and may be set as per the specific requirements of each system 100. For example purposes, in FIG. 3, the debounce range is set to be 5%. Therefore, within this debounce range, current magnitude request does not switch abruptly from one stack current magnitude to the next stack current magnitude as explained in further detail below. Including a debounce range helps to increase current stability or dwell time at each stack current magnitude and helps in reducing noise also by avoiding rapid switching between different current magnitudes.

Switching between different stack current magnitudes based on battery 115 state of charge is explained by operations of method 200 applied to stack current magnitudes and battery 115 state of charge values depicted in FIG. 3.

Upon initialization the stack current controller 105 establishes which current magnitude to request. When the method 200 starts, at 205, the stack current controller 105 is configured to obtain an initial state of charge of the battery 115 and compare it with lower state of charge thresholds 310, 320, and 330 of each of the stack current magnitudes 370-390, respectively. Based on the comparison, at 210, the initial stack current magnitude is requested. For example, if it is determined that the initial state of charge is lesser than or equal to the lower second threshold 310 of the second stack current magnitude 370, which is 25% in this example, then the highest stack current magnitude corresponding to stack current magnitude 360 is requested. If the initial state of charge of battery 115 is greater than the lower second threshold 310, but less than or equal to the lower third threshold 320, which is 35% in this example, then the stack current magnitude 370 is requested. If the initial state of charge of battery 115 is greater than the lower third threshold 320, but less than or equal to the lower fourth threshold 330, which is 45% in this example, then the stack current magnitude 380 is requested. If the initial state of charge of battery 115 is greater than the lower fourth threshold 330 then the stack current magnitude 390 is requested.

Once the initial magnitude for the stack current is identified it is set as the active stack current magnitude corresponding to the existing state of charge value for battery 115 at 210. Thereafter, continuous monitoring of the battery 115 state of charge is done. At 215 the state of charge of the battery 115 is again obtained. The battery 115 state of charge is then, at 220, compared with an upper threshold of the active stack current magnitude. For example, when the active stack current magnitude is the first stack current magnitude 360, the state of charge of the battery 115 is compared with the upper first threshold 305. The upper first threshold depicted in FIG. 3 is 30%. If the battery 115 state of charge is more than the upper first threshold 305, such as more than 30%, then at 225, a request to lower the stack current magnitude is generated by the stack current controller 105. Correspondingly, the stack current level is set to the second stack current level 370. And thereafter control of processing returns back to step 215.

However, at 220, if it is determined that the state of charge of the battery 115 is at or lower than the upper state of charge threshold of the active stack current magnitude, then the flow of processing moves to step 230. At 230, the state of charge of the battery 115 is compared with the lower state of charge threshold of the active stack current magnitude. If the state of charge is more than the lower state of charge threshold, then the stack current remains at the same stack current magnitude and control of processing returns back to the step 215.

However, at 230, if it is determined that the battery 115 state of charge is at, or lower than, the lower state of charge threshold of the active stack current magnitude, then at 235 a request to raise the stack current magnitude is generated. For example, if the active stack current magnitude is the second stack current magnitude 370 its lower state of charge threshold is the second lower threshold 310, which is 25% in the illustrated example. Further, for the stack current magnitude 370, the upper state of charge threshold is the second upper threshold 315, which is 40% as illustrated. At step 230, if the state of charge of the battery 115 is more than 25%, then the stack current remains at the magnitude 370. But if the state of charge of the battery 115 is at, or less than 25%, then at 235 a request to increase the stack current to the next stack current magnitude, which is magnitude 360, is generated.

In another example once the stack current has reached the magnitude defined by the stack current magnitude 360, and as the battery 115 is charging, the state of charge of the battery 115 is continuously monitored to check if it is lesser than the first upper threshold 305 of the stack current level 360. In the illustrated figure, the first upper threshold 305 is shown to be 30%. As the battery 115 is charging the state of charge of the battery may increase from 25% to 27%. Thus, the state of charge of 27% is again compared to the first upper threshold 305 of 30%. Since the state of charge is still less than 30% no change in stack current request happens. But when the state of charge increases beyond 30%, for example becomes 31%, the stack current magnitude is lowered and moves to the second stack current magnitude 370.

At magnitude 370, the state of charge of the battery 115 is again continuously monitored. After some time, the state of charge of the battery 115 may become 27%. 27% is lesser than the previous upper threshold 305 of 30% but is more than the lower second threshold 310 of 25%. In fact, 27% lies in the debounce range of 25%-30%. So, as long as the state of charge of the battery 115 remains within the debounce range of 25%-30% (including both these threshold values in this example, however the threshold values may be outside of the debounce range in other embodiments), the stack current magnitude does not switch. Similar scenarios happen when the battery 115 state of charge is within the debounce range of 35%-40% and 45%-50% as illustrated in FIG. 3. Thus, because of the presence of these debounce ranges, the stack current controller 105 may provide more dwell time at each stack current magnitude and avoid rapid noisy switching between different stack current magnitudes than the controller 105 would be able to if the debounce ranges were not present.

It may be noted that the example values of the battery 115 state of charge shown in FIG. 3, which comprise values such as 25%, 30%, 35%, 40%, 45% and 50%, are considered for illustrative purposes. Any suitable range of values of the battery 115 state of charge may be selected to provide the various features and functionalities disclosed herein, without deviating from the scope of the present disclosure.

As another example, when the battery 115 continues to charge, the state of charge of the battery 115 becomes greater than 45%, 45.5% for example. 45.5% is lesser than the third upper threshold 325 which is 50% in this case. This is determined at step 220. But 45.5% is above the fourth lower threshold 330, which is 45% as determined at step 230. Thus, as per the method 200, the flow of processing returns to step 215, and no change in stack current magnitude happens. While the battery 115 is charging, this loop repeats until the state of charge of the battery 115 becomes larger than the third upper threshold 325.

As the battery 115 continues to charge, the state of charge of the battery 115 becomes greater than the third upper threshold 325, 50% for example. At step 220 the stack current controller 105 compares the state of charge of the battery 115 against the third upper threshold 325. Because the battery 115 state of charge is greater than 50%, the stack current controller 105 moves to step 225 where the stack controller 105 commands a lower stack current magnitude 390, which in this example is the minimum stack current magnitude.

If the battery 115 continues to charge, the stack current controller repeats the above steps and maintains the stack current at the stack current magnitude 390.

However, if the state of charge of the battery 115 begins to decrease, the stack current controller 105 increases the stack current magnitude in a stepwise manner similar to how the stack current magnitude is reduced in a stepwise manner as described above. For example, the state of charge of the battery 115 obtained by the stack current controller 105 at step 215 may be 55%. At step 230 the stack current controller 105 compares the state of charge of the battery 115 against the fourth lower threshold 330, which in this example is between and including 45% and 100%. Because 55% is more than the fourth lower threshold 330 the stack current controller 105 verifies that the current request is at the stack current magnitude 390 and makes no changes to the current request at step 230. This loop repeats until the state of charge of the battery 115 falls outside (or becomes lesser than) the fourth lower threshold 330.

As the battery 115 continues to discharge, the state of charge of the battery 115 becomes less than the fourth lower threshold 330, 44% for example. At step 230 the stack current controller 105 compares the state of charge of the battery 115 against the fourth lower threshold 330 which in this example is 45% then the stack current controller 105 moves to step 235 and requests for increasing the stack current magnitude to the level 380. But, if the state of charge of the battery 115 is 47%, which falls within the debounce range of 45%-50%, no change in stack current magnitude happens as processing moves from 235 back to 215.

The stack current controller 105 continues processing as described above with respect to the different stack current magnitudes 360-390 and different state of charge thresholds 305-330. Thus, operation of the fuel cell 110 at a stack current magnitude that may induce resonance amongst the air compressor 120 and the fan 125 may be avoided by setting the stack current magnitudes 360-390 to avoid such a resonance causing stack current magnitude. Additionally, the frequency of switching between stack current magnitudes is reduced, thus providing a more stable operating environment for fuel cell 110 as described below.

One purpose for the upper and lower thresholds is to inhibit the stack current from "bouncing" from one magnitude to another. Without the thresholds, there may be a single battery 115 state of charge percentage, for example, 30%, that operates as a condition to switch from one stack current magnitude 360 to another stack current magnitude 370. If a battery 115 state of charge fluctuates between 28% and 32% the stack current magnitude will change each time the battery 115 state of charge moves past the 30% threshold. However, by implementing upper and lower thresholds associated with each stack current magnitude frequent changes from one stack current magnitude to another stack current magnitude may be inhibited. For example, with the thresholds when the battery 115 state of charge fluctuates between 28% and 32% the stack current magnitude requested by controller 105 may change from level 360 to level 370 as the battery 115 state of charge moves from 28% to 32%. But, once the stack current magnitude requested by controller 105 is at level 370, the request from controller 105 will remain for the current magnitude corresponding to level 370 even as the battery 115 state of charge continues to fluctuate between 32% and 28% as described above. The upper and lower thresholds in the above example create a 5% debounce range for each current magnitude 360, 370, 380, and 390, however, any suitable percentage may be used for a debounce range.

Additionally, the debounce range may be different for different stack current magnitudes. For example, a preferred stack current magnitude may have a larger debounce range to facilitate more operation at that preferred stack current magnitude. Thresholds for each current magnitude may be designed to accommodate one or more of operating characteristics of a fuel cell, the operational environment for a fuel cell, the operational profile for a fuel cell, or for other suitable factors. Whether stack current magnitude switching occurs when a battery state of charge is equal to an upper or lower threshold is a design consideration. Therefore, stack current switching may occur when a battery state of charge is equal to an upper or lower threshold, may occur when a battery state of charge surpasses an upper or lower threshold, or may be a combination of being equal to or surpassing an upper or lower threshold.

The stack current controller 105 may therefore determine a stack current magnitude request based on the state of charge of the battery 115 and the stack current magnitudes corresponding to different static state of charge thresholds, upper thresholds, and lower thresholds.

In one example, if the battery 115 state of charge is less than 30%, then the stack current controller 105 requests 275 A stack current (the corresponding first requested stack current magnitude 360). If the battery 115 state of charge is less than 40%, then the stack current controller 105 requests 200 A stack current (which is the corresponding second requested stack current magnitude 370). If the battery 115 state of charge is less than 50%, then the stack current controller 105 requests 150 A stack current (which is the corresponding third requested stack current magnitude 380). It may be noted that three different levels of requested stack current magnitudes and corresponding three different battery 115 state of charge thresholds have been considered here only for the purpose of example. In fact, any number of levels of requested stack current magnitudes and corresponding different battery 115 states of charge thresholds may be possible without deviating from the scope of the present disclosure.

In other embodiments, if the state of charge of the battery 115 is less than a battery state of charge threshold, for example 75%, the stack current controller 105 may trigger a smart idle function as described in greater detail below. According to an embodiment, triggering the smart idle function refers to initiating controlling a coolant temperature of the fuel cell. The controlling of the coolant temperature may refer to maintaining a coolant temperature at a coolant temperature setpoint.

Additionally, in some embodiments, a second lowest current magnitude, such as level 380, may be considered as a learning level to match an average truck power. The second lowest level refers to a battery 115 state of charge corresponding to which the second lowest stack current magnitude is requested. The stack current controller 105 may be configured to estimate an average truck power consumption over time to determine the average truck power. The stack current controller 105 may further determine an average current magnitude needed for the truck based on the average truck power. Further, the stack current magnitude corresponding to the second lowest level may be changed to match the average current determined by the controller 105 needed for the truck based on the average truck power. For example, if the controller determined that the average current is 155 A, the current magnitude associated with level 380 may be changed from 150 A to 155 A. As a result, the average current magnitude needed for the truck may be met by requesting output at level 380 which may result in dwelling at level 380 for longer periods of time than when level 380 corresponded to 150 A output by the stack 515 longer, which in turn reduces a number of times the stack current and environment conditions of the fuel cell need to change. In other words, the stack current controller 101 may dynamically set one or more of the current levels based on evaluations of operation of a vehicle powered by the fuel cell 110, for example, to minimize the need to switch between stack currents.

Figure 4:
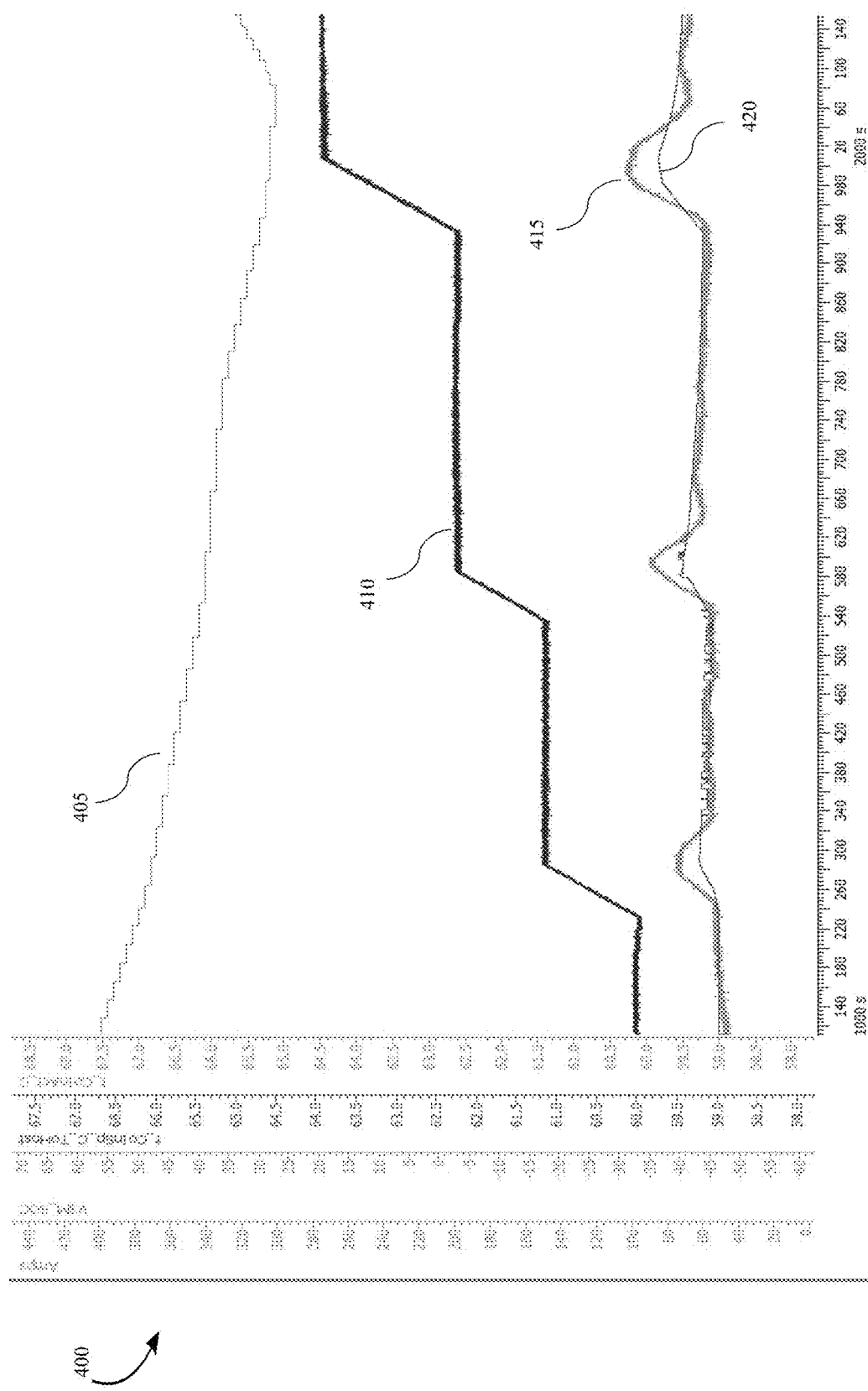
FIG. 4 shows various plots depicting variation of different parameters, in accordance with some embodiments of the present disclosure.

FIG. 4 shows a diagrammatic representation 400 of various plots depicting variation of different parameters, in accordance with some embodiments of the present disclosure. A curve 405 represents a variation of the state of charge of the battery 115. A curve 410 represents a variation of the stack current magnitude request. A curve 415 represents a variation of an actual coolant temperature. A curve 420 represents a variation of the coolant temperature setpoint.

From the curves 405 and 410, it may be noted that as the battery 115 state of charge decreases, the stack current magnitude request increases. Further, from the curves 415 and 420, it can be inferred that the coolant temperature set point is maintained or is easier to maintain than if a debounce range were not included.

Cool Ambient Temperature Operation

Figure 5:
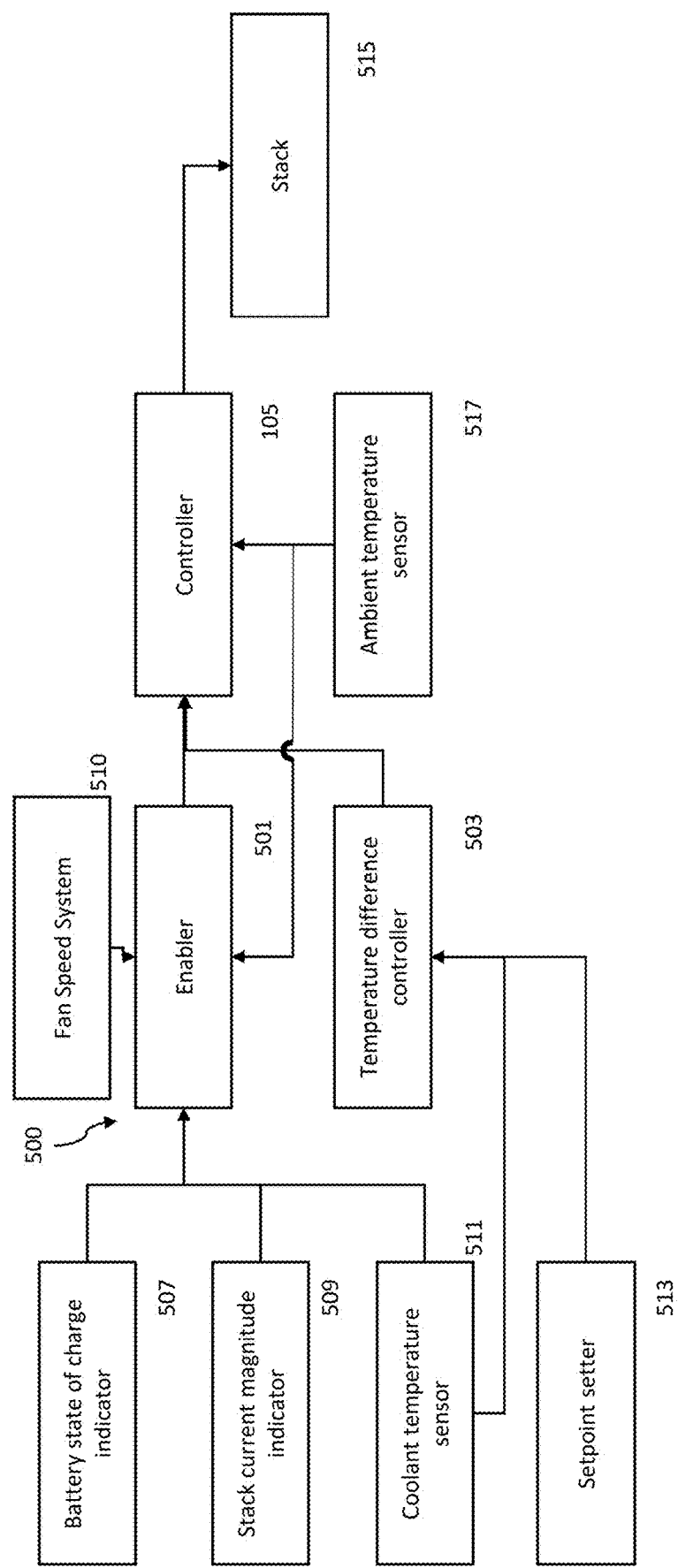
FIG. 5 shows a block diagram of a system for controlling a stack current of a fuel cell, in accordance with one or more embodiments of the present disclosure.

FIG. 5 shows a block diagram of a system 500 for controlling a coolant temperature indicated by a coolant temperatures sensor 511 of a fuel cell 110 (FIG. 1), in accordance with one or more embodiments of the present disclosure. The system 500 may be used in conjunction with the system 100. The system 500 includes a controller labeled as an enabler 501, a controller that operates as a temperature difference calculator 503, and a controller 105. The enabler 501, the temperature difference calculator 503, and the controller 105 may be separate components, or may be physically combined into one component and differentiated by software or other suitable programming or logic circuitry.

The coolant temperature as sensed by the coolant temperature sensor 511 may be used for maintaining the coolant temperature at a desired coolant temperature setpoint established by the setpoint controller 513. The setpoint controller 513 may be a setpoint setter. According to an embodiment, the setpoint controller 513 is configured to monitor a chemical reaction inside a fuel cell and output setpoints that are desired for the chemical reaction, such as desired coolant temperature, the temperature difference of the coolant before it is used to cool the stack and after the coolant has been used to cool the stack, cathode airflow, the state of whether hydrogen valves are on or off, and other suitable functions. The setpoint controller 513 may receive inputs relating to one or more of a dew point temperature of cathode inlet air, a stack current, coolant temperature, and an average stack cell voltage magnitude.

The enabler 501 obtains a battery state of charge from a battery state of charge indicator 507, which may be a battery management system or a voltage indicator, a magnitude of the stack current, typically measured in Amperes (A), from the stack current magnitude indicator 509, and a coolant temperature, for example, in degrees Celsius, as indicated by the coolant temperature sensor 511. Based on the information from the battery state of charge indicator 507, the enabler 501 determines whether the battery state of charge is less than a threshold battery state of charge, for example, equal to or less than 85%. If the battery state of charge is less than the threshold battery state of charge, then the enabler 501 may send a command to the controller 105 to initiate controlling the coolant temperature as described in greater detail below. In some embodiments, initiating controlling the coolant temperature may be referred to as enabling 'smart idle'. Further, if the battery state of charge is greater than the threshold battery state of charge, then a normal operation may be continued. In some embodiments the battery state of charge may be the only information used by the controller 501 to determine whether to initiate controlling the coolant temperature. In other embodiments the battery state of charge may be used along with other information by the controller 501 to determine whether to initiate controlling the coolant temperature.

In some embodiments, the enabler 501 may determine whether the stack current magnitude indicated by the stack current magnitude indicator 509 is less than a threshold stack current magnitude, for example, less than or equal to 120 A. Further, if the stack current magnitude is greater than the threshold stack current magnitude, regardless of the battery state of charge, then the normal operation may be continued. Alternatively, the enabler 501 may determine whether the stack current magnitude is greater than zero, and if so, use that information combined with other information to initiate controlling the coolant temperature as described in greater detail below. For example, if the stack current magnitude is greater than zero and the battery state of charge is less than the battery state of charge threshold, then the enabler 501 may send a command to the controller 105 to initiate controlling the coolant temperature as described in greater detail below. In some embodiments the stack current magnitude may be the only information used by the controller 501 to determine whether to initiate controlling the coolant temperature. In other embodiments the stack current magnitude may be used along with other information by the controller 501 to determine whether to initiate controlling the coolant temperature.

The enabler 501 may determine whether the coolant temperature as indicated by the coolant temperature sensor 511 is below a coolant temperature setpoint threshold, for example, equal to or more than 0.2 C below the coolant temperature setpoint established by the setpoint controller 513. Further, if the coolant temperature is within the coolant temperature threshold, then normal operation may be continued regardless of the battery state of charge and regardless of the stack current magnitude. In some embodiments the coolant temperature may be the only information used by the controller 501 to determine whether to initiate controlling the coolant temperature. In other embodiments the coolant temperature may be used along with other information by the controller 501 to determine whether to initiate controlling the coolant temperature. For example, if the battery state of charge is less than the battery state of charge threshold, the stack current magnitude is greater than zero, and the coolant temperature is below the coolant temperature threshold, then the enabler 501 may send a command to the controller 105 to initiate controlling the coolant temperature as described in greater detail below.

According to some embodiments, the temperature difference controller 503 may be configured to determine a difference between the actual coolant temperature as indicated by the coolant temperature sensor 511 and the coolant temperature setpoint established by the setpoint controller 513. The difference between the coolant temperature and the coolant temperature setpoint may be referred to as an error. The error may be provided to the controller 105 and used for controlling the coolant temperature as described in greater detail below.

The controller 105, upon receiving the command to initiate controlling the coolant temperature from the enabler 501, and based at least in part on the error from the temperature difference controller 103, determines a stack current magnitude to request from the stack 515 such that the requested stack current magnitude may be the lowest current magnitude that provides sufficient heat to maintain the actual coolant temperature within the coolant temperature threshold with respect to the coolant temperature setpoint established by the setpoint controller 513. The stack 515 is part of the fuel cell 110 (FIG. 1). The controller 105 may also modulate the current magnitude requested from the fuel cell stack 515 as described in greater detail below. In some embodiments, the controller 105 may start with an initial starting value for a current magnitude to request from the stack 515 where the initial starting value may be based on an ambient temperature received from an ambient temperature sensor 517 and a lookup table, for example, residing within the controller 105. The lookup table may include different current magnitude values to use as the starting value where each current magnitude value corresponds to an ambient temperature. For example, if the ambient temperature is 21° C., the corresponding current magnitude value may be 110 A. Look up table values may be customized based on the characteristics of the fuel cell. The current magnitude output from the stack 515 may be modulated by the controller 105 to slowly ramp to the current magnitude requested by the controller 105, for example, at a rate of 1 A per minute. When the requested current magnitude is reached, the controller 105 may start monitoring the error from the temperature difference controller 503 to determine whether a different stack current magnitude should be requested as described in greater detail below.

The requested stack current magnitude may be applied to a validator, for example, a program running on the controller 105. The validator is configured to determine if the requested stack current magnitude is between the minimum and maximum stack current magnitudes that the stack 515 is capable of producing. If the requested stack current magnitude is between the minimum and the maximum stack current magnitudes that the stack 515 is capable of producing, then the validator does not block the requested stack current magnitude from being transmitted to the stack 515. If the requested stack current magnitude is greater than the maximum stack current magnitude that the stack 515 is capable of producing, the validator may tell the controller 105 to request the maximum current magnitude that the stack 515 is capable of producing instead of the previously requested current magnitude.

In one embodiment, the requested stack current magnitude is the lowest current magnitude that provides sufficient heat to maintain the coolant temperature within the coolant temperature threshold with respect to the coolant temperature setpoint set by the setpoint controller 513. Therefore, the actual coolant temperature may become equal to the coolant temperature setpoint or remain within the coolant temperature threshold. When the coolant temperature is maintained within the coolant temperature threshold using the lowest current magnitude a minimal amount of energy is consumed to maintain the coolant temperature within the coolant temperature threshold with respect to the coolant temperature setpoint. Optionally, while controlling the coolant temperature a fan associated with the fuel cell 110 may be set to the lowest speed, or may be turned off, to reduce dispersing heat and conserving energy.

Optionally, controlling the coolant temperature by the controller 105 may be disabled for certain situations. For example, where controlling the coolant temperature may be enabled based on the battery state of charge being less than a threshold battery state of charge, controlling the coolant temperature by the controller 105 may be disabled when the battery state of charge is less than the threshold battery state of charge, but the ambient temperature is relatively high, for example, above 25° C. Alternatively, where controlling the coolant temperature is enabled when the coolant temperature is outside of the coolant temperature threshold, controlling the coolant temperature by the controller 105 may be disabled when the current magnitude being produced by the stack 515 (such as during normal operation) is greater than a current magnitude that the controller 105 would use as an initial starting current magnitude to begin controlling the coolant temperature.

Figure 6:
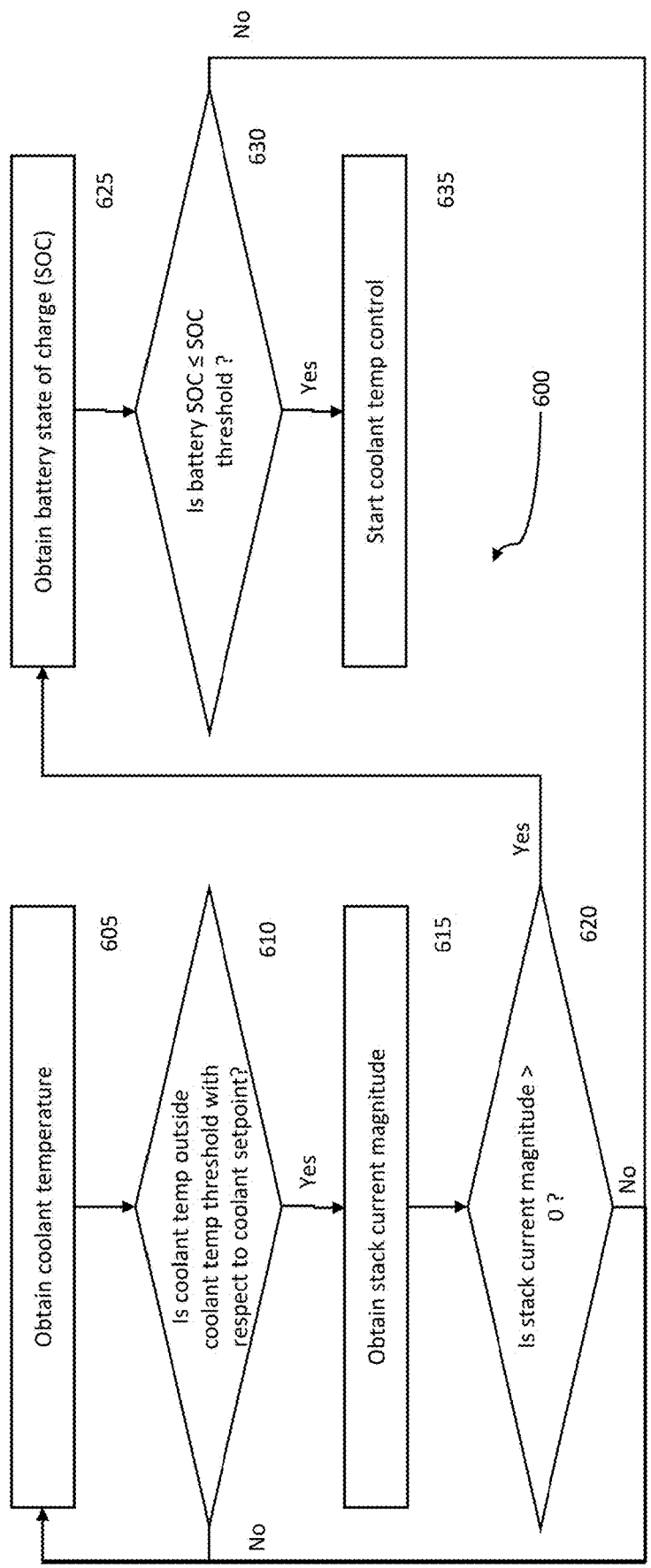
FIG. 6 shows a flowchart of a method of initiating a coolant temperature control in accordance with one or more embodiments of the present disclosure.

FIG. 6 shows a flowchart of an example method 600 of initiating coolant temperature control, in accordance with one or more embodiments of the present disclosure. At 605 the coolant temperature is obtained by the enabler 501, for example, from the coolant temperature sensor 511. In some embodiments the actual coolant temperature may be measured before the coolant is used to transfer heat from the fuel cell. In other embodiments the actual coolant temperature may be measured after the coolant is used to transfer heat from the fuel cell. The enabler 501 may be an independent controller or may be a program or other suitable configuration integrated into the controller 105.

At 610 the enabler 501 determines whether the coolant temperature is outside of the coolant temperature threshold. For example, the coolant temperature threshold may be 0.2° C. and may be established to be cooler than the setpoint value in ° C. by the setpoint setter 513. The difference between the setpoint temperature and the actual coolant temperature is referred to as an error (setpoint temperature-actual coolant temperature) and is a positive value as long as the actual coolant temperature is less than the setpoint temperature. Other suitable coolant temperature thresholds may be used; and may be based on the operating characteristics of a fuel cell. For example, a coolant temperature threshold may be in the range of 0.0° C. to 1.0° C., inclusive of the endpoints. The enabler 501 may subtract the actual coolant temperature from the setpoint coolant temperature, and if a positive value of the error is larger than the coolant temperature threshold processing may continue at 615. However, if the error is smaller than the coolant temperature threshold processing may return to 605 without initiating coolant temperature control.

At 615 the magnitude of the current being produced by the stack 515 is obtained by the enabler 501, for example, from the stack current magnitude indicator 509.

In one embodiment, the enabler 501 may determine whether the current magnitude output by the stack 515 is greater than zero at 620, thus indicating that the fuel cell is operating. If the current magnitude output by the stack 515 is greater than zero processing may continue at 625. However, if current magnitude output by the stack 515 is zero processing may return to 605 without initiating coolant temperature control.

In other embodiments, the enabler 501 may determine whether the current magnitude output by the stack 615 is less than, or is less than or equal to, a current magnitude threshold, for example less than 110 A. If the current magnitude output by the stack 515 is equal to or less than the current magnitude threshold processing may continue at 625. However, if the current magnitude output by the stack 515 is greater than the current magnitude threshold processing may return to 605 without initiating coolant temperature control.

At 625 the enabler 501 obtains the battery 115 state of charge from the battery state of charge indicator 507. The battery state of charge indicator 507 may comprise a battery management system associated with a battery, a voltage indicator, or other suitable device.

At 630 the enabler 501 determines whether the battery state of charge is equal to or less than, or in some embodiments just less than, a state of charge threshold. For example, the state of charge threshold may be in the range of 50% to 90%, inclusive of the endpoints, and may be 85% in one embodiment. If the battery state of charge is equal to or less than the state of charge threshold then the enabler 501 may request the controller 105 to initiate controlling the coolant temperature at 635. However, if the battery state of charge is greater than the state of charge threshold processing may return to 605 without initiating coolant temperature control.

Figure 7:
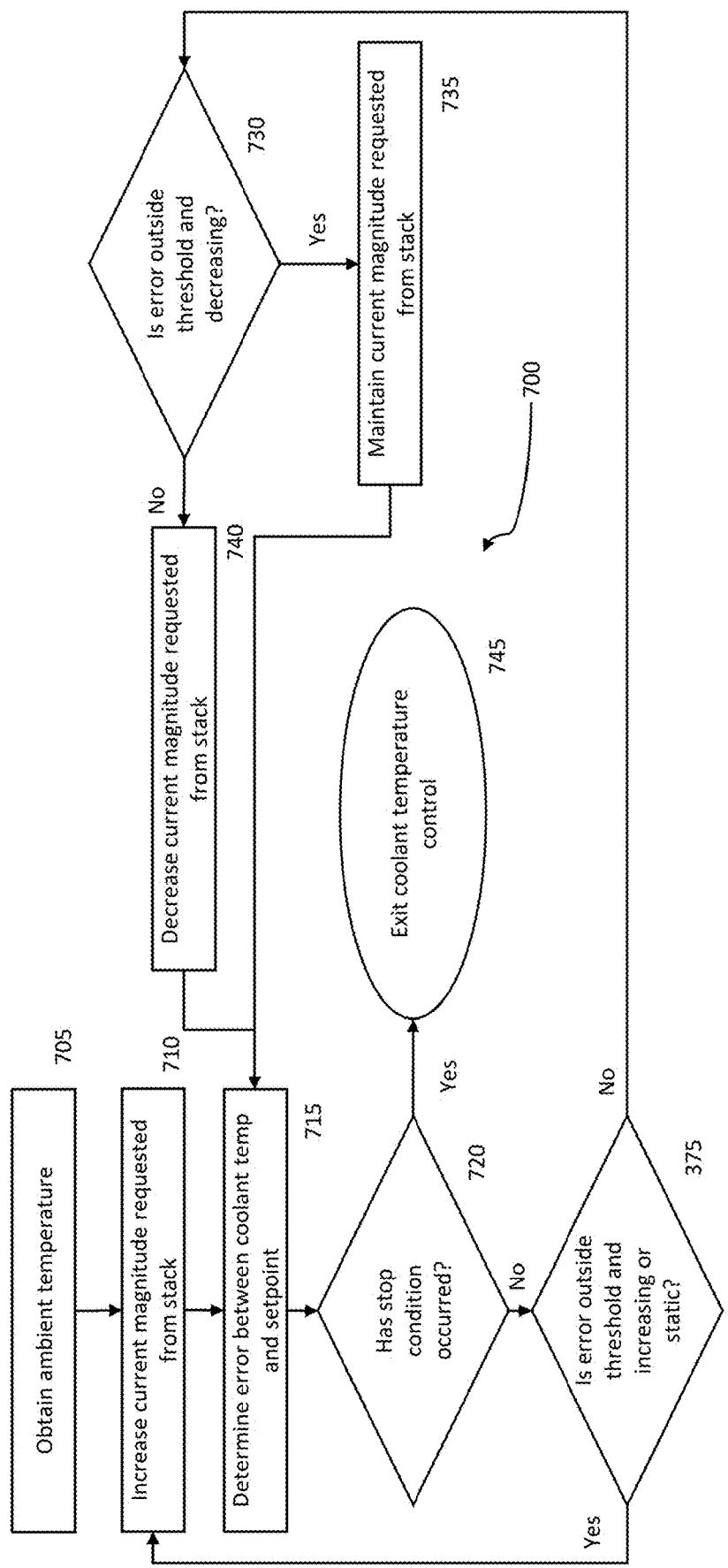
FIG. 7 shows a flowchart of a method of controlling the coolant temperature, in accordance with one or more embodiments of the present disclosure.

FIG. 7 shows a flowchart of an example method 700 of coolant temperature control, in accordance with one or more embodiments of the present disclosure. At 705 the controller 105 obtains the ambient temperature from the ambient temperature sensor 517 and determines a starting value for the initial current magnitude to request from the stack 515. For example, a lookup table residing within the controller 105 may correlate different ambient temperatures with different starting values for the initial current magnitude to request from the stack 515 and the controller 105 may use the value that most closely corresponds to the measured ambient temperature or may interpolate the starting value for the initial current magnitude to request based on the measured ambient temperature and the data in the lookup table. Other suitable manners for determining the starting value for the initial current magnitude to request from the stack 515 may be used in other embodiments. For example, the controller 105 may be programmed to select a value that is a predetermined percentage greater than the current magnitude being produced by the stack 515 as an initial value or the initial value for the current magnitude to request from the stack 515 may be based on how large of an error exists between the actual coolant temperature and the setpoint coolant temperature.

At 710 the controller 105 requests the initial value for the current magnitude from the stack 515 thus causing the magnitude of the current being produced by the stack 515 to increase. The controller 105 may request the stack 515 to ramp up to the requested current magnitude at a predetermined rate, such as 1 A per minute. Selecting a ramp rate may facilitate smooth and reliable operation of the fuel cell with relatively slow and predictable changes to its operation opposed to simply having the fuel cell operate at its maximum capacity to reach the requested current magnitude output by the stack 515. For some embodiments, step 710 is optional and may be omitted.

At 715 the controller 105 determines the error between the coolant temperature setpoint and the actual coolant temperature. For example, the controller 105 may obtain the error from the temperature difference controller 503.

At 720 the controller 105 may evaluate whether a coolant temperature control stop condition has occurred. Example stop conditions include, but are not limited to, an increase in the ambient temperature such as an increase above a predetermined percentage of the ambient temperature that was measured when coolant temperature control started, the battery state of charge exceeds the state of charge threshold, the coolant temperature rises above the coolant temperature setpoint, the stack 515 receives a request for a current magnitude that is greater than the current magnitude being requested by the controller 105, the coolant temperature falls within the coolant temperature threshold, or other suitable condition. An individual condition may be used as a stop condition, or two or more conditions may be combined to create a stop condition, for example, the coolant temperature falling within the coolant temperature threshold and the ambient temperature increasing. If a stop condition has occurred processing ends at 745. Otherwise processing continues at 725.

At 725 the controller 105 determines whether the error is outside of the coolant temperature threshold, for example, 0.2° C., and whether the error is either static, that is, not changing, or whether the error is increasing. If the error is greater than the coolant temperature threshold and is either increasing or static, processing continues at 710 where the controller 515 requests an increase of the magnitude of the current being produced by the stack 515. If the error is less than the coolant temperature threshold, or if the error is greater than the coolant temperature threshold, but is decreasing, then processing continues at 730.

At 730 the controller 105 determines whether the error is greater than the coolant temperature threshold and is decreasing. If so, processing continues at 735 where the controller 105 continues to request the current magnitude output by the stack 515 at the same magnitude and returns to 715 for processing. If not, processing continues at 740 where the controller 105 requests a decrease of the current magnitude output by the stack 515 before returning to 715 for processing. At 740 the controller 105 may request a lesser current magnitude because the coolant temperature is within the coolant temperature threshold. Requesting a decrease to the current magnitude output by the stack 515 may prevent the coolant temperature from exceeding the coolant temperature setpoint.

Figure 8:
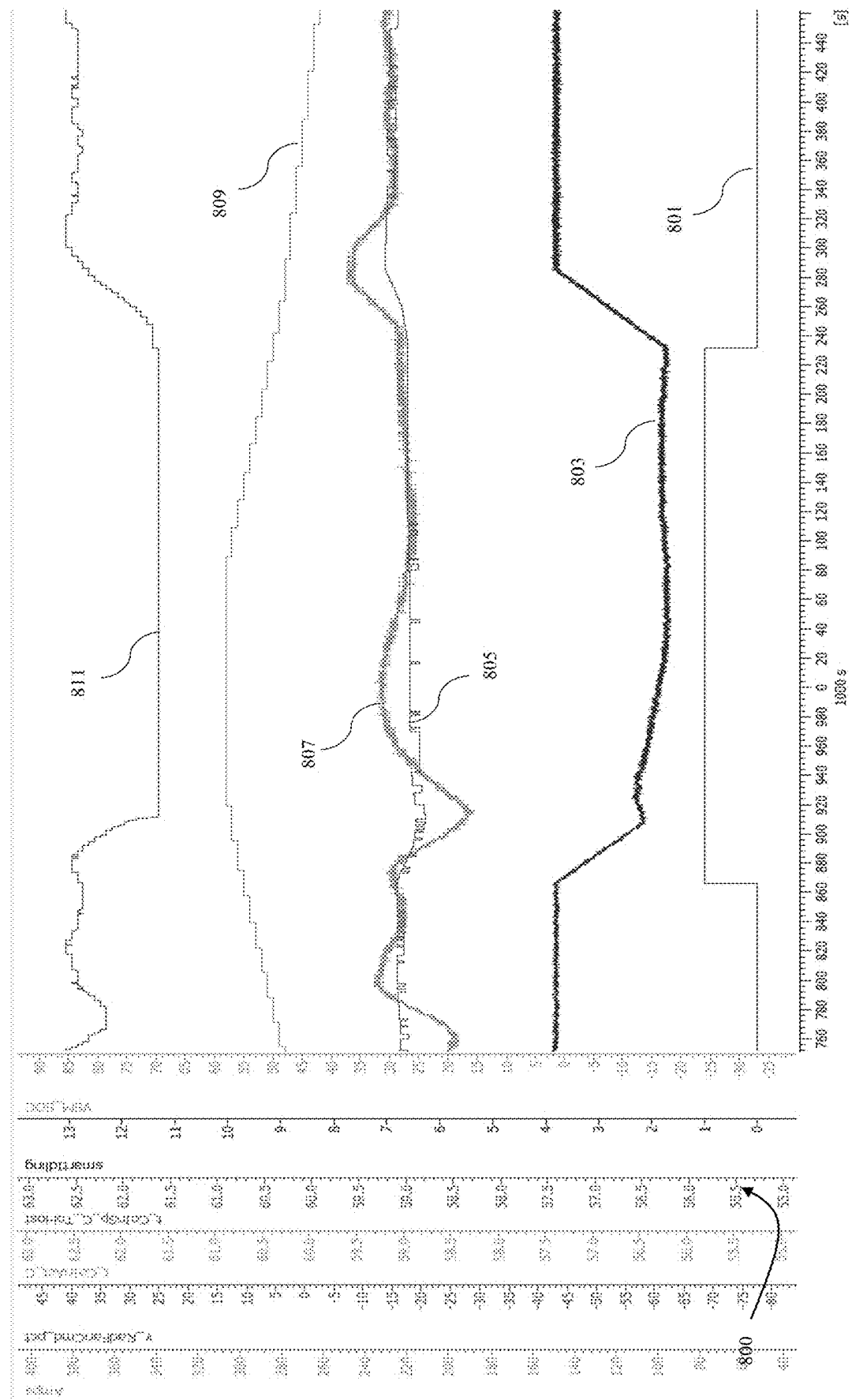
FIG. 8 shows various plots depicting variation of different parameters during controlling the coolant temperature, in accordance with one or more embodiments of the present disclosure.

FIG. 8 shows a hypothetic diagrammatic representation 800 of various plots depicting variation of different parameters during controlling the coolant temperature via controlling the stack current magnitude, in accordance with one or more embodiments of the present disclosure. Curve 801 represents enabling and disabling the coolant temperature control. Curve 803 represents variation of the requested stack current magnitude in response to enabling and disabling the coolant temperature control. Curve 805 represents variation of the coolant temperature setpoint before, during, and after coolant temperature control. Curve 807 represents variation of the actual coolant temperature in response to enabling and disabling the coolant temperature control. Curve 809 represents variation of the battery state of charge in response to enabling and disabling the coolant temperature control. Curve 811 represents variation of the fan speed in response to enabling and disabling the coolant temperature control. For example, a fan associated with a fuel cell's cooling system may be commanded to slow down while coolant temperature control is operating to facilitate increasing the coolant temperature towards the coolant temperature setpoint. In some embodiments, the fan may not be completely shut off to maintain a greater pressure within the fuel cell housing with respect to atmospheric pressure surrounding the fuel cell to aid flushing any accumulated hydrogen out of the fuel cell housing.

It may be observed from the curves 801, 803, 805, 807, and 809 shown in FIG. 8 that the coolant temperature control is initiated when the actual coolant temperature is below the coolant temperature setpoint and the battery state of charge is less than the state of charge threshold, for example, 80%. When the coolant temperature control is enabled, the actual coolant temperature may eventually become equal to the coolant temperature setpoint. Also, it may be observed from the curve 803 that, when the coolant temperature control is enabled, the stack current magnitude changes and becomes steady when the actual coolant temperature becomes equal to the coolant temperature setpoint or falls within the coolant temperature threshold of the coolant temperature setpoint.

The various embodiments described above provide variation in stack current request based on state charge of battery and enabling a smart idle function for controlling coolant temperature of the fuel cell when the coolant temperature falls below a coolant temperature setpoint. Additionally, a 5% debouncing may be implemented while switching between different stack current levels. These two control strategies may be combined to facilitate making fuel cell operation more robust, stable, and easier to maintain, in comparison to systems where stack current is changed based on truck power demands and a smart idle is not included.

Warm Ambient Temperature Operation

FIG. 5 shows a block diagram of a system 500 associated with a fuel cell 110 (FIG. 1) for controlling and/or modulating a stack current, such as a stack current value created by a fuel cell stack 515 requested by a stack controller 105, in accordance with one or more embodiments of the present disclosure. The system 500 includes an enabler controller 501, a temperature difference controller 503, and a stack controller 105. The enabler controller 501 may be configured to command the stack controller 105 to control the fuel cell stack 515 to create an electrical current. The temperature difference controller 503 may be configured to calculate a difference between an actual coolant temperature and a coolant temperature setpoint and create an error value that is input into the stack controller 105 as described below. The temperature difference controller 503 may also provide coolant temperature and coolant temperature setpoint information to the enabler controller 501. The stack controller 105 is configured to cause the fuel cell stack 515 to output a requested stack current magnitude based on inputs from the enabler controller 501 and the temperature difference controller 503 as described below.

A battery state of charge system 507, a fan speed determination system 510, and an ambient temperature sensor 517, which may comprise a thermocouple, thermometer, or other suitable device, are configured to provide inputs into the enabler controller 501.

The coolant temperature setpoint system 513 defines a coolant temperature setpoint as is known in the art for efficient operation of a fuel cell. For example, the coolant temperature setpoint system 513 may be configured to monitor a chemical reaction inside the fuel cell and output setpoints that are optimal for the chemical reaction. Some of the monitored factors for the chemical reaction may include coolant temperature, coolant temperature difference before entering the fuel cell stack 515 and after leaving the fuel cell stack 515, cathode airflow, and the position of hydrogen valves in either on or off positions. The coolant temperature setpoint established by the coolant temperature setpoint system 513 may be affected by one or more of a dew point temperature of cathode inlet air, a stack current value, actual coolant temperature, an average stack cell voltage, or other suitable factors.

The coolant temperature sensor 511 provides inputs into the temperature difference controller 503. The temperature difference controller 503 also receives inputs from the coolant temperature setpoint system 513.

A fuel cell 110 may also comprise an air compressor 120 and a fan 125 (FIG. 1). The air compressor 120 may blow air into the fuel cell 110 for use in the chemical reaction that creates electricity and the fan 125 may be configured to cool the fuel cell 110. The fuel cell 110 may be used to supply power to charge a battery 115. Energy from the battery 115 may be used to power an industrial vehicle, such as a forklift, or other suitable vehicle.

While the components of system 500 are illustrated as separate from each other, one skilled in the art will understand that such components may be separate as illustrated, or one or more components can be physically included on the same controller, or otherwise be suitably co-located.

During fuel cell operation, the stack controller 105 commands stack current magnitudes from the fuel cell stack 515. The commanded stack current magnitude, typically measured in amperage, from the stack controller 105 may be based on the state of charge of a battery 115 that is charged by the fuel cell stack 515. As a hypothetic example, if the battery state of charge is relatively low, 25% for example, a relatively high stack current, 275 amps for example, may be commanded. Or, if the battery state of charge is relatively high, 90% for example, a relatively low stack current, 60 amps for example, may be commanded. Under normal operating conditions, commanded stack current magnitudes vary depending on the state of charge of the battery being charged by the fuel cell 110 as described above.

Continuing the hypothetic example, it is possible for a fuel cell to operate in a relatively hot environment. Because electricity, water, and waste heat are typically created during fuel cell operation, operation in a hot environment based on the state of charge of a battery may not be feasible because such operation may exceed the cooling capabilities of the fuel cell 110. In such an instance it may be beneficial to limit the current created by the fuel cell stack 515 to inhibit overheating the fuel cell. By limiting the current to a stack current ceiling, a lesser current magnitude may be commanded from the fuel cell stack 515 than the current that would otherwise be commanded based on the battery state of charge. Using such a stack current ceiling may charge the battery 115 more slowly, but a lesser amount of waste heat may also be generated by the fuel cell stack 515 which may facilitate cooling the fuel cell 110 to maintain efficient operation.

Figure 9:
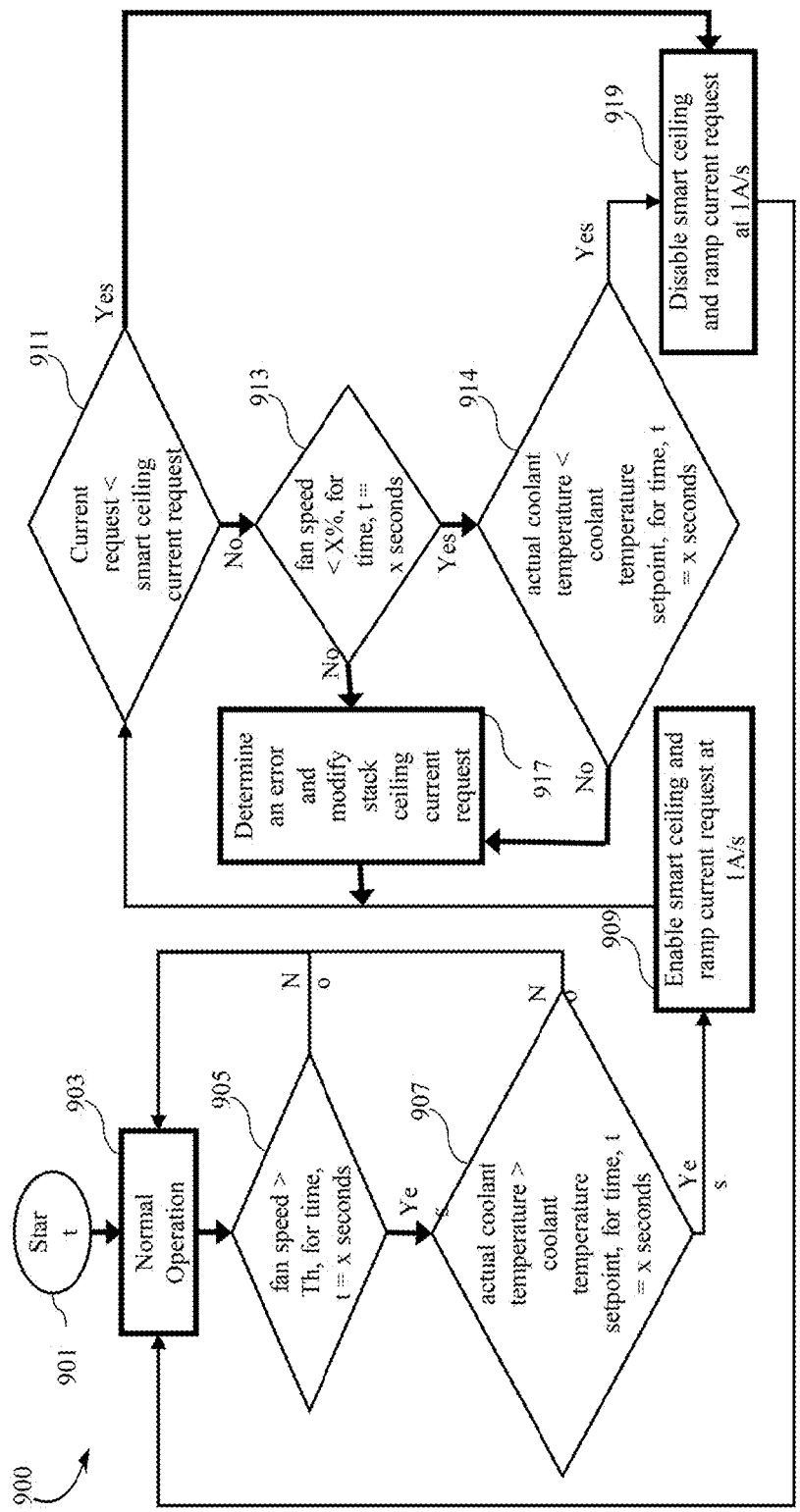
FIG. 9 shows a flowchart diagram depicting a process for controlling the stack current magnitude in accordance with one or more embodiments of the present disclosure.

FIG. 9 shows a flowchart depicting an example smart ceiling process 900 for controlling the stack current magnitude of the fuel cell stack 515, in accordance with one or more embodiments of the present disclosure. The process 900 starts at step 901 where a battery 115 state of charge is transmitted from the battery state of charge indicator 507 to the enabler controller 501, a fan speed is transmitted from the fan speed system 510 to the enabler controller 501, and a coolant temperature is transmitted from the coolant temperature sensor 511 to the enabler controller 501.

Then enabler controller 501 assesses the battery state of charge, the fan speed, and the coolant temperature at steps 903, 905, and 907, respectively, to determine whether commanding a stack current under a normal operation should be performed or whether commanding a stack current smart ceiling should be implemented. At step 903, a stack current under a normal operation is determined by the enabler controller 501 based on the battery 115 state of charge. Normal operation may include step-wise current control with debounce ranges as described above.

At step 905, the enabler controller 501 compares the fan speed received from the fan speed system 510 against a threshold fan speed. The threshold fan speed may be, for example, 80%, 90%, or other suitable percentage of the full speed of which the fan 125 is capable. If the fan speed is below the threshold fan speed the enabler controller 501 continues on the "No" branch from step 905 and commands the stack controller 105 to request the stack current magnitude determined in step 903 from the fuel cell stack 515. However, if the enabler controller 501 determines that the fan speed is above the threshold fan speed the enabler controller 501 then determines whether the fan speed has exceeded the threshold fan speed for a predetermined time-period. For example, the predetermined time-period may be 5 seconds, 10 seconds, or other suitable amount of time. If the fan speed has been above the threshold fan speed, but for a time that is less than the predetermined time-period, the enabler controller 501 continues on the "No" branch from step 905 and commands the stack controller 105 to request the stack current magnitude determined in step 903 in the fuel cell stack 515. If the fan speed has been above the fan speed threshold for an amount of time equal to or greater than the predetermined time-period the enabler controller 501 proceeds to step 907.

At step 907, the enabler controller 501 compares the coolant temperature received from the coolant temperature sensor 511 against the coolant temperature setpoint received from the setpoint setter 513. If the coolant temperature is below the coolant temperature setpoint the enabler controller 501 continues on the "No" branch from step 907 and commands the stack controller 105 to request the stack current magnitude determined in step 903 from the fuel cell stack 515. However, if the enabler controller 501 determines that the coolant temperature is above the coolant temperature setpoint threshold, for example, 0.05° C. to 1.0° C., inclusive of the endpoints, above the coolant temperature setpoint, the enabler controller 501 then determines whether the coolant temperature has exceeded the coolant temperature setpoint threshold for a predetermined time-period. In other embodiments the controller 501 may simply determine whether the coolant temperature exceeds the coolant temperature setpoint. For example, the predetermined time-period may be 3 seconds, 8 seconds, or other suitable amount of time, which may be the same amount of time used at 905. If the coolant temperature has been above the coolant temperature setpoint, but for a time that is less than the predetermined time-period, the enabler controller 501 continues on the "No" branch from step 907 and commands the stack controller 105 to request the stack current magnitude determined in step 903 from the fuel cell stack 515. If the coolant temperature has been above the coolant temperature setpoint for an amount of time equal to or greater than the predetermined time-period the enabler controller 501 proceeds to step 909.

At step 909 a stack current ceiling is established. A stack current ceiling may be beneficial when the fuel cell 110 is operating in a relatively high temperature environment, for example, 25° C. or higher, 30° C. or higher, or other suitable temperature, and the battery 115 state of charge is relatively low, for example, 60% or less, 50% or less, or other suitable state of charge. Under such conditions, normal operation for the fuel cell 110 attempts to implement a relatively high stack current magnitude to charge the battery 115 as quickly as possible. However, doing so may overheat the fuel cell 110 if the cooling system is not able to cope with both the relatively high ambient temperature and the waste heat generated by implementing a relatively high stack current magnitude. Implementing a stack current magnitude ceiling may generate a lesser amount of waste heat and enable the fuel cell 110 to charge the battery 115 as quickly as possible without overheating.

At step 909 the controller 105 accesses a lookup table that contains a list of ambient temperatures and corresponding stack current magnitudes. In some example embodiments, the current values in the lookup table may be populated by test data of thermally stable current magnitudes at various ambient temperatures. Such a look up table may be the same look up table discussed above or may be a separate look up table associated with the controller 105 or with another suitable controller. Ambient temperatures may be atmospheric ambient temperature surrounding fuel cell 110, ambient temperature within the fuel cell 110, or other suitable ambient temperature. Each stack current magnitude is designated as a stack current magnitude that is likely to result in the fuel cell 110 operating in the corresponding ambient temperature where the fuel cell 110 may achieve the coolant temperature reaching the coolant temperature setpoint. Based on the ambient temperature the enabler controller 501 uses the lookup table to find, or interpolate, a corresponding stack current magnitude to use as the initial stack current magnitude ceiling. Other suitable methods for selecting or determining an initial stack current magnitude ceiling may be used. Still at step 909, the stack current magnitude is ramped at a predetermined rate, such as 1 amp per second, until the stack current ceiling magnitude is reached.

At step 911 the controller 105 compares the stack current magnitude ceiling against the stack current magnitude determined in step 903. If the stack current magnitude determined in step 903 is less than the stack current magnitude ceiling the stack ceiling routine is disabled at step 919, the stack current magnitude is ramped at a predetermined rate, such as 1 amp per second, until the stack current magnitude determined in step 903 is reached, and processing returns to steps 903, 905, and 907.

At step 911, if the stack current magnitude determined in step 903 is greater than the stack current magnitude ceiling processing moves to step 913 where the controller 105 determines whether the fan speed received from the fan speed system 510 is less than a predetermined threshold, for example, 90% of the fan's rated maximum speed. Such predetermined threshold at step 913 may be the same as the predetermined threshold used at step 905, or it may be a different predetermined threshold. If the fan speed is greater than the predetermined threshold processing continues at step 917 where the magnitude of the stack current ceiling may be lowered before returning to step 911.

However, at step 913 if the fan speed is less than the predetermined threshold, the controller 105 then determines whether the fan speed has been less than the predetermined threshold for a predetermined time-period, for example, 20 seconds or other suitable time. If the fan speed has not been below the predetermined threshold for the predetermined time-period processing continues at step 917 where the magnitude of the stack current ceiling may be lowered before returning to step 911 as described above. If the fan speed has been below the predetermined threshold for the predetermined time-period processing continues to step 914.

At step 914, the controller 105 determines whether the coolant temperature received from the coolant temperature sensor 511 is less than the coolant temperature setpoint received from the setpoint setter 513. If the coolant temperature is greater than the coolant temperature setpoint processing continues at step 917 where the magnitude of the stack current ceiling may be lowered before returning to step 911 as described above. If the coolant temperature is less than the coolant temperature setpoint, the controller 105 then determines whether the coolant temperature has been less than the coolant temperature setpoint for a predetermined time-period, for example, 20 seconds. The predetermined time-period for the fan speed to be below a predetermined threshold and the predetermined time-period for the coolant temperature to be below the coolant temperature setpoint may be the same amount of time, or different amounts of time. If the coolant temperature has not been below the coolant temperature setpoint for the predetermined time-period processing continues at step 917 where the magnitude of the stack current ceiling may be lowered before returning to step 911 as described above. If the coolant temperature has been below the coolant temperature setpoint for the predetermined time-period processing continues to step 919 where the stack ceiling routine is disabled and the stack current magnitude is ramped at a predetermined rate, such as 1 amp per second, until the stack current magnitude determined in step 903 is reached, and processing returns to steps 903, 905, and 907.

Consider the following hypothetic example. A forklift truck including a battery charged by a hydrogen fuel cell may be equipped with a system, such as system 500. Under normal operating conditions, the stack controller 105 provides a stack current magnitude to request from the fuel cell stack 515 where the stack current magnitude is determined based on the state of charge of the battery 115. For example, if the state of charge of the battery 115 is 25% the controller 105 may set the stack current magnitude to a maximum amount, such as 275 amps, using normal operation processes as described above with respect to FIGS. 2 and 3. On the other hand, if the battery 115 state of charge is 95% the controller 105 may set the stack current magnitude to a minimum amount, such as 60 amps. Under normal operating conditions as described above with respect to FIGS. 2 and 3, the cooling system for the fuel cell 110 comprising a fan 125, radiator (not illustrated) and other related components, is able to maintain the coolant temperature at or near the coolant temperature setpoint which varies according to operating conditions for the fuel cell 110.

However, if the forklift truck is operating in a relatively high temperature environment, such as 33° C. and the battery 115 state of charge is relatively low, for example between 20% to 30% the stack current magnitude desired under normal operating conditions may not be feasible because operating at such a stack current magnitude may produce more waste heat in the hot environment than the fuel cell's cooling system can dissipate.

Continuing the hypothetic example in a 33° C. environment with a 20% state of charge for the battery, the controller 105 may provide a stack current magnitude of 275 amps to request from the fuel cell stack 515. As the fuel cell stack 515 generates the 275 amps it also produces waste heat. In response, the cooling fan 125 may begin operating at higher fan speeds to dissipate the heat. However, because of the hot environment the cooling system is less efficient than it is when operating in a cooler environment, so the fan speed continues to increase. At the same time, the fuel cell coolant temperature also increases.

At some point, the fan speed crosses a predefined threshold, which may be, for example, a fan speed above 85% of the rated maximum fan speed, a fan speed above 90% of the rated maximum fan speed, a fan speed above 95% of the rated maximum fan speed, or other suitable threshold. Before the fan speed has exceeded the predetermined threshold for a predetermined time-period, for example, 10 seconds, 15 seconds, 20 seconds, 25 seconds, or other suitable time-period, the controller 105 continues to provide a stack current request of 275 amps to the stack 515.

Eventually, the fan speed exceeds the predefined threshold for the predefined time-period and the controller 105 assesses the coolant temperature. If the cooling system is not able to keep up with the heat dissipation demands created by operating at 275 amps in the 33° C. environment the coolant temperature will exceed the coolant temperature setpoint provided by the setpoint setter 513. With the fan speed exceeding the predetermined threshold for longer than the predetermined time-period, but before the coolant temperature has exceeded the coolant temperature setpoint for a predetermined time-period, for example, 10 seconds, 15 seconds, 20 seconds, 25 seconds, or other suitable time-period, the controller 105 continues to provide a stack current request of 275 amps to the stack 515.

However, once both the fan speed exceeds the predetermined threshold for longer than the predetermined time-period and the coolant temperature exceeds the coolant temperature setpoint, or a coolant temperature setpoint upper threshold, for a predetermined time-period a stack current magnitude ceiling is used to replace the maximum stack current magnitude (assuming that the battery state of charge is now 25% and thus remains in the range where a maximum stack current would be commanded under normal operating conditions).

The controller 105 accesses a look-up table to obtain, or interpolate, a stack current magnitude to use as the stack current ceiling based on operating in an ambient temperature of 33° C. Based on a 33° C. environment the controller 105 may set a current value of 200 amps as the initial stack current magnitude ceiling. The controller 105 then provides the stack current magnitude ceiling of 200 amps to the stack the fuel cell stack 515 which ramps its current magnitude from 275 amps to 200 amps at a rate of 1 amp per second, or other suitable ramp rate.

Once the fuel cell stack 515 is producing a current equal to the stack current magnitude ceiling of 200 amps the controller 105 compares the stack current magnitude ceiling against the current magnitude that would be commanded if the fuel cell 110 were operating under normal conditions. For example, if the battery 115 had charged sufficiently such that the maximum current magnitude for the fuel cell stack 515 is no longer applicable, for example, a battery state of charge of 60%, and the stack current magnitude based on a 60% state of charge is 175 amps, the controller 105 would request the current of 175 amps from the fuel cell stack 515 to ramp its current from 200 amps to 175 amps at a rate of 1 amp per second. Normal operation for the stack current would then ensue, that is, the stack current magnitude provided by the controller 105 would be based on the battery state of charge as described above with reference to FIGS. 2 and 3. On the other hand, if the battery state of charge is low enough, 25%-30% for example, such that a current above 200 amps would be commanded under normal operating conditions the controller 105 maintains the 200 amp request to the stack 515 and begins monitoring the fan speed and coolant temperature again.

If the fan speed continues exceeding a predefined threshold for a predefined time-period, which may be a continuation of the previously used predefined threshold and predefined time-period, or may be a separate predefined threshold and/or predefined time-period, the controller 105 receives a coolant temperature error from the temperature difference controller 503. Based on this error, the controller 015 modifies the stack current magnitude ceiling. For example, if the error indicates that the coolant temperature is above the coolant temperature setpoint, or above a coolant temperature threshold with respect to the setpoint, the controller 105 may change the stack current magnitude ceiling from 200 amps to 190 amps. On the other hand, if the error indicates that the coolant temperature is at or below the coolant temperature setpoint, or a coolant temperature threshold with respect to the setpoint, the controller 105 may change the stack current ceiling magnitude from 200 amps to 210 amps.

The controller 105 then compares the new stack current ceiling magnitude against the current magnitude that would be commanded if the fuel cell 110 were operating under normal conditions. Assuming that the new stack current magnitude ceiling is 190 amps and the battery state of charge is now 27% with a corresponding normal condition stack current of 275 amps the controller 105 continues this loop until either (1) the stack current magnitude ceiling becomes a greater value than the normal condition stack current magnitude that would be commanded based on the state of charge of the battery 115 as described above, in which case the controller 105 returns to normal operation and setting the stack current magnitude based on the battery state of charge, or (2) the fan speed either does not exceed the predetermined threshold, or exceeds the predetermined threshold, but for a time less than the predetermined time-period.

If condition (2) in the preceding paragraph is met, the controller 105 monitors the coolant temperature as long as condition (2) continues to be met. If the coolant temperature continues exceeding the coolant temperature setpoint for a predefined time-period, which may be a continuation of the previously used predefined time-period, or may be a separate predefined time-period, the controller 105 receives a coolant temperature error from the temperature difference controller 503. Based on this error, the controller 105 modifies the stack current magnitude ceiling. For example, if the error indicates that the coolant temperature is above the coolant temperature setpoint the controller 105 may change the stack current magnitude ceiling from 190 amps to 180 amps. On the other hand, if the error indicates that the coolant temperature is at or below the coolant temperature setpoint the controller 105 may change the stack current ceiling from 190 amps to 200 amps.

The controller 105 then compares the new stack current magnitude ceiling against the current magnitude that would be commanded if the fuel cell 110 were operating under normal conditions. Assuming that the new stack current magnitude ceiling is 180 amps and the battery state of charge is now 29% with a corresponding normal condition stack current of 275 amps the controller 105 continues this loop until either (1) the stack current magnitude ceiling becomes a greater value than the normal condition stack current magnitude that would be commanded based on the state of charge of the battery 115, in which case the controller 105 returns to normal operation and setting the stack current magnitude based on the battery 115 state of charge as described above, or (3) the coolant temperature either does not exceed the coolant temperature setpoint, or exceeds the coolant temperature setpoint, but for a time less than the predetermined time-period.

If condition (3) in the preceding paragraph is met, the controller 105 returns to normal operation and setting the stack current magnitude based on the battery 115 state of charge as described above.

Figure 10:
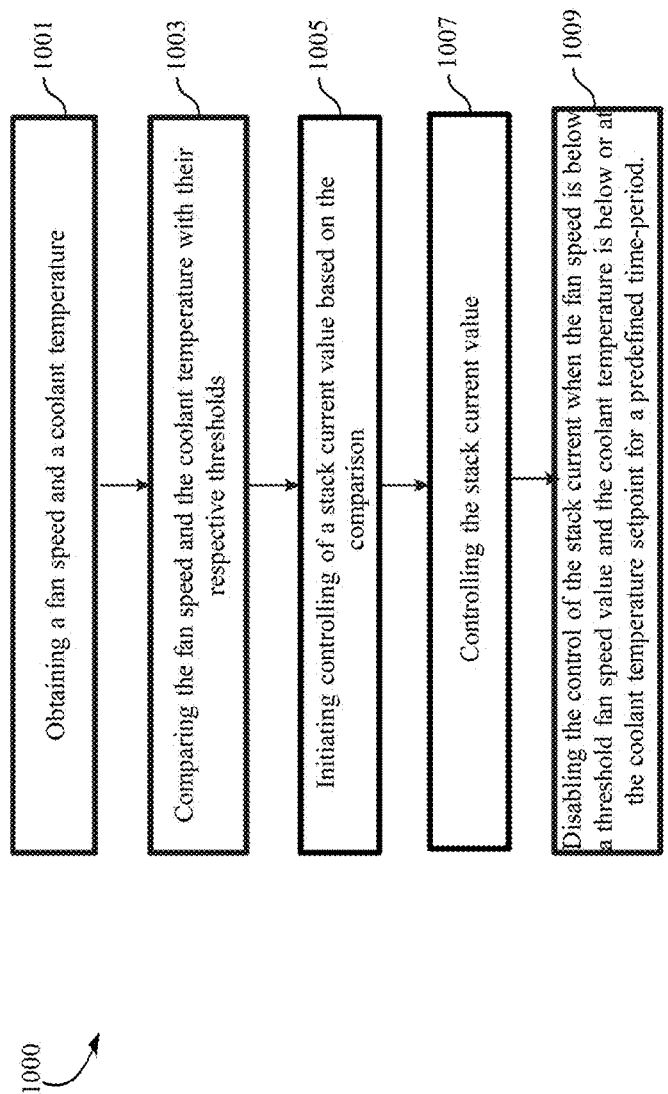
FIG. 10 shows a flowchart diagram of a method of controlling the stack current in accordance with one or more embodiments of the present disclosure.

FIG. 10 shows a flowchart of a method 1000 of controlling the stack current magnitude in accordance with one or more embodiments of the present disclosure. The method 1000 may be performed by the system 500. At block 1001, the method 1000 includes obtaining the fan speed, and the coolant temperature. Further, at block 1003, the method 1000 includes comparing the fan speed, and the coolant temperature with their respective thresholds. For instance, the comparison is performed to determine if the fan speed is greater than the threshold fan speed value, such as 90% of the fan's rated maximum speed, for a predefined time-period, such as 15 seconds, and if the coolant temperature is greater than the coolant temperature setpoint, such as 60° C., for the predefined time-period, such as 20 seconds.

At block 1005, the method 1000 includes initiating controlling the coolant temperature based on the comparison performed at 1003. For instance, a stack current ceiling function may be enabled to provide control of the stack current magnitude for the fuel cell stack 515 when both the fan speed exceeds the threshold fan speed value and the coolant temperature exceeds the coolant temperature setpoint, for their respective predefined time-periods, which may be the same time-period, or may be different time periods. For example, a stack current ceiling may be established based on a look-up table that correlates thermally stable currents for different ambient temperatures, or other suitable method may be used to establish a stack current ceiling. Further, at block 1007 the method 1000 includes controlling the stack current ceiling based on the stack current ceiling value determined at step 1005. For example, the error value, i.e., the difference between the coolant temperature and the coolant temperature setpoint may be determined and used to modify the stack current ceiling created at step 1005. For instance, an initial stack current ceiling value, such as 120 A may be initialized based on an ambient temperature (e.g., 21° C.) and a lookup table that includes the current values corresponding to a variety of ambient temperatures. Then the current commanded from the fuel cell stack 515 is ramped down from the operating current magnitude to the stack current ceiling magnitude at a steady rate, for example, 1 A/s. When the stack current is ramped down to the stack current ceiling, the error between the coolant temperature setpoint and the actual coolant temperature is used to continuously modify the stack current ceiling, and at the same time fan speed and coolant temperature are monitored to determine whether to resume normal operation for establishing the stack current based on the battery state of charge.

Furthermore, at block 1009, the method 1000 includes abandoning the stack current ceiling and resuming control of the stack current based on the battery state of charge as described above when (1) the fan speed is below the threshold fan speed value and the coolant temperature is below or at the coolant temperature setpoint for their respective predefined time-periods, or (2) the stack current that would be commanded based on the battery state of charge is less than the stack current ceiling. Abandoning the stack current ceiling is followed by ramping the stack current up to the normal operation current at a steady rate, for example, 1 A/s.

Figure 11:
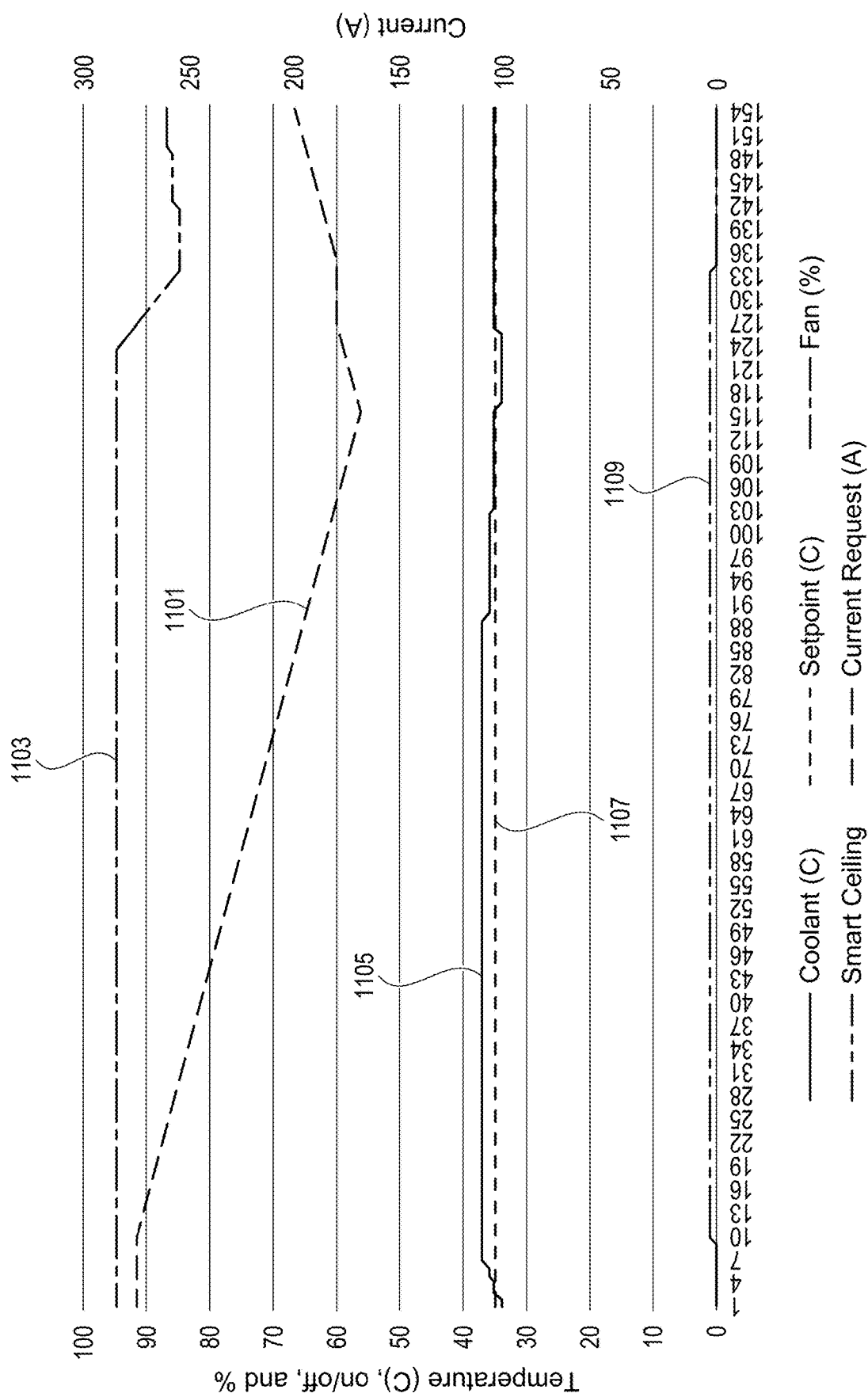
FIG. 11 shows various plots depicting variation of different parameters during the controlling of the stack current, in accordance with one or more embodiments of the present disclosure.

FIG. 11 shows a hypothetic diagrammatic representation 1100 of various plots depicting variation of different parameters during the controlling of the stack current magnitude in accordance with one or more embodiments of the stack ceiling control described above. A curve 1101 represents a variation of a requested stack current magnitude in response to enabling and disabling the stack current smart ceiling function. A curve 1103 represents a variation of the fan speed in response to enabling and disabling the stack current ceiling function. A curve 1105 represents a variation of the actual coolant temperature in response to enabling and disabling the stack current ceiling function. A curve 1107 represents a variation of the coolant temperature setpoint. A curve 1109 represents enabling and disabling the stack current ceiling function.

It may be observed from the curves 1101, 1103, 1105, 1107, and 1109 shown in FIG. 11 that the stack current ceiling function may be enabled when both the fan speed is greater than the threshold fan speed value and the actual coolant temperature is greater than the coolant temperature setpoint, for their respective predefined time-periods. When the stack current ceiling function is enabled the stack current magnitude requested is ramped down from an operational stack current magnitude to a stack current ceiling magnitude such that the actual coolant temperature eventually becomes equal to the coolant temperature setpoint. Also, it may be observed from the curve 1109 that when the stack current ceiling function is enabled the stack current changes and becomes steady when the fan speed is less than the threshold fan speed value and the actual coolant temperature is below or equal to the coolant temperature setpoint for their respective predefined times, for example, 20 seconds. Further, from the curves 1103 and 1105, it may be noted that the fan speed decreases when the actual coolant temperature decreases or becomes equal to the coolant temperature setpoint for a predefined time-period. The actual coolant temperature decreases or becomes equal to the coolant temperature setpoint when the fuel cell generates less waste heat while charging the battery. The fuel cell may not require dissipating such lesser amount of waste heat resulting in the fan speed decreasing, as is shown in the curve 1103. In this manner, enabling the stack current ceiling function at the right time and right conditions of the fan speed and the coolant temperature may facilitate the battery and the fuel cell attaining a suitable operating condition. The suitable operating condition may be one or more of an ambient temperature inside of the fuel cell, a maximum power output of the fuel cell, a desired operating temperature of the fuel cell, or other suitable condition.

There may be situations where the stack current ceiling function may not be enabled to attain the suitable operating condition. For instance, the battery may be depleted, such as the battery SOC at 20%, and the fuel cell may be heated up, for example, the coolant temperature being significantly above the coolant temperature setpoint, for example by 1.5° C. to 2.0° C. In such instance, an operator (e.g., an automated operator or a manual operator) of a vehicle (e.g., an automated vehicle, a semi-automated vehicle or a manually operated vehicle) may be notified of the drained battery and the heated fuel cell. To that end, some functionalities of the vehicle may be disabled for some time. For instance, the functionalities, such as speed limit of the vehicle, acceleration of the vehicle, and/or hydraulic lift of the vehicle may be disabled for 5 minutes to cool down the battery and the fuel cell and attain the suitable operating condition.

The various embodiments described above provide variation in stack current magnitude request based on one or more of state charge of a battery, enabling a smart idle function for controlling coolant temperature of the fuel cell when the coolant temperature falls below a coolant temperature setpoint, and enabling a smart ceiling function for controlling coolant temperature of the fuel cell when the coolant temperature rises above a coolant temperature setpoint, singularly, or in any combination. Additionally, a 5% debouncing may be implemented while switching between different stack current levels during normal operation. These three control strategies may be combined to facilitate making fuel cell operation more robust, stable, and easier to maintain, in comparison to systems where stack current is changed based on truck power demands and/or a smart idle and a smart ceiling are not included.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. For example, processing described in connection with one system or controller may be performed by a different system or controller, or one system or controller may perform processing described for multiple systems or controllers. As another example, a fuel cell may operate with one of, or any combination of, normal stack current control, cool ambient temperature operation (smart idle), and warm ambient temperature operation (smart ceiling). The exemplary embodiments were chosen and described to best explain the principles of the present disclosure and its practical application, to thereby enable others skilled in the art to best utilize the present disclosure and various embodiments with various modifications as are suited to the particular use contemplated.

The invention claimed is:

1. A method for requesting a current magnitude from a fuel cell, the method comprising:
  requesting a current magnitude from the fuel cell, where the current magnitude requested is based at least on a state of charge of a battery and is performed in a stepwise manner among a plurality of current magnitude steps, where each current magnitude step includes a debounce range with respect to at least one other current magnitude step;
  outputting by the fuel cell the requested current magnitude;
  determining an average current output by the fuel cell over a time period; and
  modifying a current magnitude associated with one of the current magnitude steps based on the average current.

2. The method according to claim 1, wherein determining the average current output by the fuel cell over the time period comprises:
  determining an average power consumed by a system including the fuel cell; and
  converting the average power into the average current.

3. The method according to claim 1, wherein:
  said one of the current magnitude steps is a second lowest among the current magnitude steps.

4. The method according to claim 1, wherein:
  the debounce range of said one of the current magnitude steps is larger than the debounce range of at least one of the other current magnitude steps.

5. The method according to claim 1, wherein:
  the debounce range of said one of the current magnitude steps is larger than the debounce ranges of each of the other current magnitude steps.

6. The method according to claim 1, further comprising:
  determining an average current output by the fuel cell over a subsequent time period; and
  modifying the current magnitude associated with said one of the current magnitude steps based on the average current output by the fuel cell over the subsequent time period.

7. A system, comprising:
  a battery;
  a fuel cell electrically connected to the battery; and
  a stack current controller coupled to at least one of the battery and the fuel cell and configured to:
    request a current magnitude from the fuel cell, where the current magnitude requested is based at least on a state of charge of the battery and is performed in a stepwise manner among a plurality of current magnitude steps, where each current magnitude step includes a debounce range with respect to at least one other current magnitude step;
    control the fuel cell to output the requested current magnitude;
    determine an average current output by the fuel cell over a time period; and
    modify a current magnitude associated with one of the current magnitude steps based on the average current.

8. The system according to claim 7, wherein the stack current controller is further configured to:
  determine an average power consumed by the system; and
  convert the average power into the average current.

9. The system according to claim 7, wherein:
  said one of the current magnitude steps is a second lowest among the current magnitude steps.

10. The system according to claim 7, wherein:
  the debounce range of said one of the current magnitude steps is larger than the debounce range of at least one of the other current magnitude steps.

11. The system according to claim 7, wherein:
  the debounce range of said one of the current magnitude steps is larger than the debounce ranges of each of the other current magnitude steps.

12. The system according to claim 7, wherein the stack current controller is further configured to:
- determine an average current output by the fuel cell over a subsequent time period; and
- modify the current magnitude associated with said one of the current magnitude steps based on the average current output by the fuel cell over the subsequent time period.

13. A system, comprising:
- means for storing charge;
- means for generating current electrically connected to the means for storing charge;
- means for requesting a current magnitude from the means for generating current, where the current magnitude requested is based at least on a state of charge of the means for storing charge and is performed in a stepwise manner among a plurality of current magnitude steps, where each current magnitude step includes a debounce range with respect to at least one other current magnitude step;
- means for outputting by the means for generating current the requested current magnitude;
- means for determining an average current output by the means for generating current over a time period; and
- means for modifying a current magnitude associated with one of the current magnitude steps based on the average current.

14. The system according to claim 13, wherein the means for determining the average current output by the means for generating current over the time period comprises:
- means for determining an average power consumed by the system; and
- means for converting the average power into the average current.

15. The system according to claim 13, wherein:
said one of the current magnitude steps is a second lowest among the current magnitude steps.

16. The system according to claim 13, wherein:
the debounce range of said one of the current magnitude steps is larger than the debounce range of at least one of the other current magnitude steps.

17. The system according to claim 13, wherein:
the debounce range of said one of the current magnitude steps is larger than the debounce ranges of each of the other current magnitude steps.

18. The system according to claim 13, further comprising:
- means for determining an average current output by the means for generating current over a subsequent time period; and
- means for modifying the current magnitude associated with said one of the current magnitude steps based on the average current output by the means for generating current over the subsequent time period.

* * * * *